(12) United States Patent
Tabuchi et al.

(10) Patent No.: US 11,025,086 B2
(45) Date of Patent: Jun. 1, 2021

(54) POWER CONVERSION DEVICE

(71) Applicant: Mitsubishi Electric Corporation, Chiyoda-ku (JP)

(72) Inventors: Akiko Tabuchi, Chiyoda-ku (JP); Kikuo Izumi, Chiyoda-ku (JP); Naohisa Kawahara, Chiyoda-ku (JP); Daigo Takemura, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/850,131

(22) Filed: Apr. 16, 2020

(65) Prior Publication Data
US 2020/0244096 A1    Jul. 30, 2020

Related U.S. Application Data

(63) Continuation of application No. PCT/JP2017/046332, filed on Dec. 25, 2017.

(51) Int. Cl.
*H02J 9/00* (2006.01)
*H02J 7/35* (2006.01)
(Continued)

(52) U.S. Cl.
CPC .............. *H02J 7/35* (2013.01); *H02J 7/0013* (2013.01); *H02J 7/0047* (2013.01); *H02M 3/158* (2013.01)

(58) Field of Classification Search
CPC .... H02J 9/062; H02J 9/061; H02J 9/06; H02J 9/08; H01H 2300/018
(Continued)

(56) References Cited

U.S. PATENT DOCUMENTS

2011/0006600 A1* 1/2011 Fontana ............... H02J 1/10
307/25
2011/0103114 A1* 5/2011 Huang ................. H02J 7/35
363/131
(Continued)

FOREIGN PATENT DOCUMENTS

JP    9-130977 A    5/1997
JP    2006-129585 A    5/2006
(Continued)

OTHER PUBLICATIONS

International Search Report dated Feb. 13, 2018 in PCT/JP2017/046332 filed Dec. 25, 2017, 2 pages.
(Continued)

*Primary Examiner* — Quan Tra
(74) *Attorney, Agent, or Firm* — Xsensus LLP

(57) ABSTRACT

The power conversion device includes common DC buses, AC buses, DC connection terminals, AC connection terminals, N pairs of distributed power supply connection terminals, N DC/DC converters for transferring power between the common DC buses and the distributed power supply connection terminals, M DC/AC converters for transferring power between the AC buses and the common DC buses, and a control unit for controlling each converter on the basis of a high-order control command. The DC connection terminals are connected to the common DC buses and connected to an external DC power distribution grid, the AC connection terminals are connected to the AC buses and connected to an external AC power distribution grid, and the distributed power supply connection terminals are connected to the DC/DC converters and connected to external DC distributed power supplies.

20 Claims, 34 Drawing Sheets

(51) Int. Cl.
  *H02J 7/00*    (2006.01)
  *H02M 3/158*   (2006.01)
(58) Field of Classification Search
  USPC .............................................. 307/25, 67, 104
  See application file for complete search history.

(56) References Cited

U.S. PATENT DOCUMENTS

| | | | |
|---|---|---|---|
| 2015/0069844 A1* | 3/2015 | Wu .......................... | H02J 3/32 307/74 |
| 2017/0018932 A1* | 1/2017 | Pahlevaninezhad .... | H02J 3/382 |
| 2017/0279279 A1 | 9/2017 | Shimada et al. | |
| 2018/0076637 A1 | 3/2018 | Shiraki | |
| 2019/0229609 A1* | 7/2019 | Li ........................ | H02M 7/4826 |

FOREIGN PATENT DOCUMENTS

| | | | |
|---|---|---|---|
| JP | 2014-131413 A | 7/2014 |
| JP | 2014-230454 A | 12/2014 |
| JP | 2016-182006 A | 10/2016 |
| JP | 2017-143616 A | 8/2017 |
| JP | 2017-174283 A | 9/2017 |

OTHER PUBLICATIONS

Japanese Office Action dated Jul. 10, 2018 in Japanese Patent Application No. 2018-528070 (with English Translation), 8 pages.

* cited by examiner

FIG. 11

| CASE [kw] | P10a | P10b | P11 | Pdc | Pac |
|---|---|---|---|---|---|
| X-1 | 5 | 5 | 0 | 10 | 0 |
| X-2 | 5 | 0 | -5 | 10 | -5 |
| X-3 | 0 | 0 | -10 | 10 | -10 |
| X-4 | 5 | -5 | -10 | 10 | -10 |

FIG. 12

| CASE [kw] | P10a | P10b | P11 | Pdc | Pac |
|---|---|---|---|---|---|
| Y-1 | -5 | -5 | -10 | 0 | -10 |
| Y-2 | -5 | 0 | -10 | 5 | -10 |
| Y-3 | 0 | 0 | -10 | 10 | -10 |
| Y-4 | -5 | 5 | -10 | 10 | -10 |

*FIG. 13*

| CASE [kw] | P10a | P10b | P11 | Pdc | Pac |
|---|---|---|---|---|---|
| Z-1 | 5 | 5 | 3 | 7 | 3 |
| Z-2 | -5 | -5 | -7 | -3 | -7 |

POWER CONVERSION DEVICE

TECHNICAL FIELD

The present invention relates to a power conversion device connected to a power distribution grid.

BACKGROUND ART

Conventionally, a power conversion device and a grid interconnection system for connecting a distributed power supply such as a photovoltaic generation device to a grid have been known. An AC power supply grid, a DC power supply grid, and a communication grid for connecting a plurality of power consumers and a grid power supply for supplying AC power or DC power are provided. Each power consumer sets, between the AC power supply grid and the DC power supply grid, a distributed-type power supply composed of a DC power supply unit, a PWM converter unit for converting DC power of the DC power supply unit to AC power, and a bidirectional DC/DC converter. Between the distributed-type power supplies of the power consumers, and between each distributed-type power supply and the grid power supply, power input/output control is performed via the AC power supply grid and the DC power supply grid. In addition, a common collective battery is provided on the grid power supply side to ensure a DC power supply as substitution for photovoltaic cells (for example, Patent Document 1).

A power control device as another example of a conventional power conversion device includes a first power converter for performing mutual conversion between power generated by an electric generation device and first DC power, and a second power converter for performing mutual conversion between AC power of a grid and the first DC power. The first and second power converters execute power conversion operations in synchronization with the grid frequency (for example, Patent Document 2).

CITATION LIST

Patent Document

Patent Document 1: Japanese Laid-Open Patent Publication No. 9-130977
Patent Document 2: Japanese Laid-Open Patent Publication No. 2014-230454

SUMMARY OF THE INVENTION

Problems to be Solved by the Invention

The above power conversion devices supply power to a load, using AC power received from the AC grid and DC power obtained by the distributed power supply.

In the device described in Patent Document 1, power distribution grids (power supply grids) for both DC and AC are used, and the distributed power supply is connected between the DC power distribution grid and the AC power distribution grid. Therefore, power transfer between the DC power distribution grid and the AC power distribution grid always involves charging/discharging of the distributed power supply, thus causing great constraints.

In the device described in Patent Document 2, power transfer is performed by the second power converter between an AC power distribution grid and a DC power line to or from which the first DC power is inputted/outputted. However, the DC power line is not connected to a DC power distribution grid. Therefore, power transfer between the DC power distribution grid and the AC power distribution grid cannot be performed.

The present invention has been made to solve the above problems, and an object of the present invention is to provide a power conversion device that is connected to both of a DC power distribution grid and an AC power distribution grid and interconnects a DC distributed power supply with the DC power distribution grid and the AC power distribution grid, the power conversion device allowing power transfer between the DC power distribution grid and the AC power distribution grid not via the DC distributed power supply, thus enabling power control with efficiency and a high degree of freedom.

Solution to the Problems

A power conversion device according to the present invention is a power conversion device including: N DC/DC converters; M DC/AC converters; a control unit configured to control the DC/DC converters and the DC/AC converters on the basis of a high-order control command; common DC buses; AC buses; and DC connection terminals, AC connection terminals, and N pairs of positive and negative distributed power supply connection terminals, which serve as connection terminals to outside. The DC connection terminals are connected to the common DC buses and connected to an external DC power distribution grid, the AC connection terminals are connected to the AC buses and connected to an external AC power distribution grid, and the N pairs of distributed power supply connection terminals are respectively connected to the N DC/DC converters and connected to external DC distributed power supplies. The N DC/DC converters have primary sides directly connected to the common DC buses and secondary sides directly connected to the N pairs of distributed power supply connection terminals, and each DC/DC converter performs power conversion between the common DC buses and the corresponding distributed power supply connection terminals, to transfer power therebetween. The M DC/AC converters have primary sides directly connected to the AC buses and secondary sides directly connected to the common DC buses, and each DC/AC converter performs power conversion between the AC buses and the common DC buses, to transfer power therebetween. The control unit includes a first converter control unit for each DC/DC converter and a second converter control unit for each DC/AC converter. Each first converter control unit controls the corresponding DC/DC converter by a first power command for the DC/DC converter based on the high-order control command, and each second converter control unit controls the corresponding DC/AC converter by a second power command for the DC/AC converter based on the high-order control command. The first converter control unit calculates a first correction amount in accordance with a difference between primary-side voltage of the DC/DC converter and reference voltage and corrects the first power command, to adjust power transfer to/from the distributed power supply connection terminals on the secondary side, so that power in an input direction from the distributed power supply connection terminals to the DC/DC converter is decreased when the primary-side voltage is higher than the reference voltage, and is increased when the primary-side voltage is lower than the reference voltage, while the first converter control unit limits the corrected first power command by rated power of the DC/DC converter. The power conversion device has a plurality of operation modes for transferring power between the connection terminals via the common DC buses by operations of the DC/DC converters and the DC/AC converters. The plurality of operation modes include a first power transfer mode in which power is transferred between the distributed power supply connection terminals and the DC connection terminals, a second power transfer mode in which power is transferred between the distributed power supply connection terminals and the AC connection terminals, and a third power transfer mode in which power is transferred between the DC connection terminals and the AC connection terminals, and the plurality of operation modes are determined so as to allow two or more of the operation modes to be combined at the same time.

Effect of the Invention

The power conversion device according to the present invention is connected to both of the DC power distribution grid and the AC power distribution grid, and interconnects the DC distributed power supply with the DC power distribution grid and the AC power distribution grid. Via the common DC buses and the AC buses, power transfer can be performed between the DC power distribution grid and the AC power distribution grid not via the DC distributed power supply. Thus, it becomes possible to perform power control with efficiency and a high degree of freedom.

BRIEF DESCRIPTION OF THE DRAWINGS

FIG. 11 illustrates operation examples of the power conversion device according to embodiment 1 of the present invention.

FIG. 12 illustrates operation examples of the power conversion device according to embodiment 1 of the present invention.

FIG. 13 illustrates operation examples of the power conversion device according to embodiment 1 of the present invention.

DESCRIPTION OF EMBODIMENTS

Embodiment 1

Hereinafter, a power conversion device according to embodiment 1 of the present invention will be described with reference to the drawings.

Figure 1:
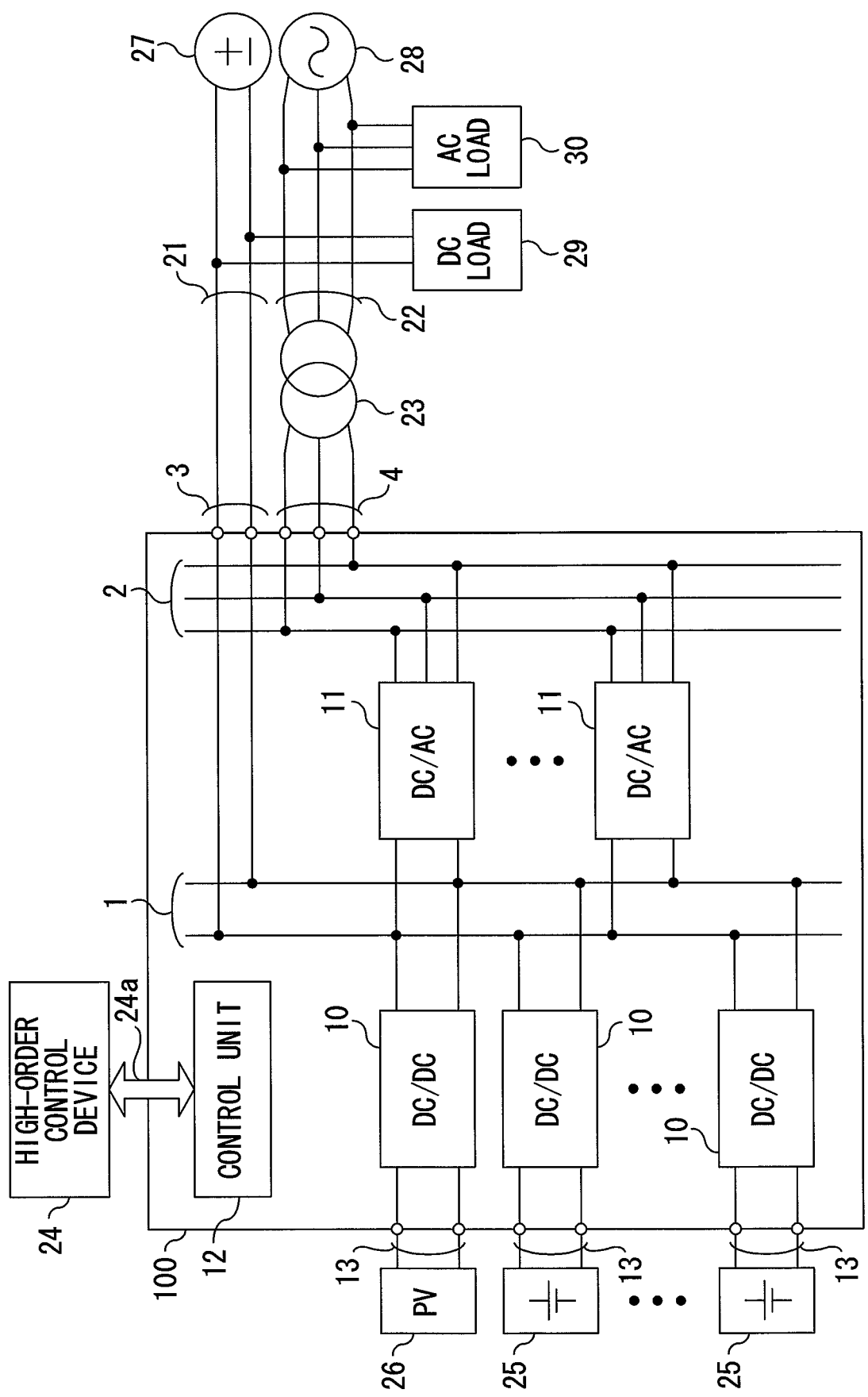
FIG. 1 is a configuration diagram of a power conversion device and a power distribution system according to embodiment 1 of the present invention.

FIG. 1 is a diagram showing the configuration of a power conversion device according to embodiment 1 of the present invention, and a power distribution system to which the power conversion device is applied.

As shown in FIG. 1, a power conversion device 100 includes: common DC buses 1; AC buses 2; and DC connection terminals 3, AC connection terminals 4, and N pairs of positive and negative distributed power supply connection terminals 13, which serve as connection terminals to outside. In addition, the power conversion device 100 includes N DC/DC converters 10, M DC/AC converters 11, and a control unit 12. It is noted that N and M are positive integers, and in this case, N is not less than 2 and not less than M.

The DC connection terminals 3 are connected to the common DC buses 1 and connected to an external DC power distribution grid 27 via DC distribution lines 21. The AC connection terminals 4 are connected to the AC buses 2 and connected to an external AC power distribution grid 28 via an external transformer 23 and AC distribution lines 22. The N pairs of distributed power supply connection terminals 13 are respectively connected to the N DC/DC converters 10, and N external DC distributed power supplies 25, 26 are connected to the N pairs of distributed power supply connection terminals 13.

The primary sides of the N DC/DC converters 10 are connected to the common DC buses 1 and the secondary sides thereof are respectively connected to the N pairs of distributed power supply connection terminals 13. Each DC/DC converter 10 performs power conversion between the common DC buses 1 and the distributed power supply connection terminals 13, to transfer power therebetween. The primary sides of the M DC/AC converters 11 are connected to the AC buses 2 and the secondary sides thereof are connected to the common DC buses 1. Each DC/AC converter 11 performs power conversion between the AC buses 2 and the common DC buses 1, to transfer power therebetween.

As a matter of course, the distributed power supply connection terminals 13 may be provided inside the power conversion device 100.

Regarding the DC/DC converters 10 and the DC/AC converters 11, the right side in the drawing is defined as the primary side and the left side is defined as the secondary side, and each converter is configured as a unit capable of bidirectional power conversion. Since each of the DC/DC converters 10 and the DC/AC converters 11 is configured as one unit as described above, it is possible to change the converter configuration of the power conversion device 100 as appropriate and it is possible to replace a failed unit alone. The common DC buses 1 and the AC buses 2 can be formed by cables, metal conductor plates, and the like, and are configured to allow the units to be connected thereto or disconnected therefrom.

The control unit 12 includes a central processing unit (CPU), a memory, and an input/output interface. For example, the memory stores various data such as command values, detection values, and data obtained by calculation, as well as a control program. The CPU reads a program and data needed for a desired calculation, from the memory, and performs the calculation.

The control unit 12 has a function of communicating with an external high-order control device 24. Using a high-order control command 24a received from the high-order control device 24, detection values of voltage, current, and the like detected in the power conversion device 100, and state information about the DC/DC converters 10 and the DC/AC converters 11, the control unit 12 controls the DC/DC converters 10 and the DC/AC converters 11, thereby controlling the entire power conversion device 100.

Each DC/DC converter 10 and each DC/AC converter 11 respectively include control circuits 32, 42 as described later, and the DC/DC converters 10 and the DC/AC converters 11 are controlled by the control unit 12 which controls the entire power conversion device 100, and the control circuits 32, 42. That is, the control unit 12 and the control circuits 32, 42 serve as a control unit for controlling the DC/DC converters 10 and the DC/AC converters 11.

The high-order control device 24 corresponds to a device generally called an energy management system (EMS), and commands the control unit 12 to perform charge/discharge operation of the power conversion device 100 or the DC distributed power supplies 25, 26 on the basis of supply and demand of power in the power distribution grids (DC power distribution grid 27, AC power distribution grid 28). The control unit 12 transmits detection values detected in the power conversion device 100 and state information about the DC/DC converters 10 and the DC/AC converters 11, to the high-order control device 24. Further, information about the DC distributed power supplies 25, 26 may be acquired by the control unit 12 and may be transmitted to the high-order control device 24.

Communication between the high-order control device 24 and the control unit 12 may be performed via a wire or wirelessly.

Each DC/DC converter 10 interchanges power in both directions between the DC distributed power supply 25, 26 and the common DC buses 1. The type of the DC/DC converter 10, e.g., an isolation type or a non-isolation type, is not particularly limited. However, since the common DC buses 1 are prescribed with the potential of the DC power distribution grid 27, the type is assumed to be an isolation type in the following description.

Regarding the power polarity and the current polarity of the DC/DC converter 10, the direction from the secondary side to the primary side is defined as positive. That is, discharging from the DC distributed power supply 25, 26 is defined as positive, and charging to the DC distributed power supply 25, 26 is defined as negative.

The DC distributed power supply 25 is a power storage device, and for example, a storage battery such as a lithium ion battery is used. A storage battery (hereafter, referred to as EV storage battery) of an electric vehicle or a hybrid vehicle may be used. That is, the DC distributed power supply 25 can not only supply power to the common DC buses 1 (discharge) but also receive power from the common DC buses 1 (charge). The DC distributed power supply 25 is a type capable of charging and discharging, such as an electric double layered capacitor.

The DC distributed power supply 26 is, for example, a photovoltaic generation panel. The DC distributed power supply 26 performs only electric generation and supplies generated power to the common DC buses 1. The DC distributed power supply 26 is a type that performs only electric generation with DC output, such as a fuel cell.

In FIG. 1, one DC distributed power supply 26 that performs only electric generation, i.e., discharging, is provided, and the other DC distributed power supplies 25 are capable of charging and discharging. However, without limitation thereto, one or more DC distributed power supplies 25 capable of charging and discharging may be connected.

Each DC/AC converter 11 interchanges power in both directions between the common DC buses 1 (DC) and the AC buses 2 (AC). Also here, the power polarity and the current polarity are defined such that the direction from the secondary side to the primary side is positive. That is, supply of power to the AC buses 2 (regeneration) is defined as positive, and supply of power from the AC buses 2 (power-running) is defined as negative.

Regarding the DC/AC converter 11, the type such as an isolation type or a non-isolation type is not particularly limited, but the type is assumed to be a non-isolation type here. As described above, the common DC buses 1 are prescribed with the potential of the DC power distribution grid 27, and therefore, the reference potential of the AC buses 2 are also prescribed at the DC power distribution grid 27. In general, DC buses (common DC buses 1) are required to be isolated from the AC power distribution grid 28. Therefore, in the case where the DC/AC converter 11 is a non-isolation type, the AC buses 2 are connected to the AC distribution lines 22 via the transformer 23.

A DC load 29 to which DC power is supplied is connected to the DC power distribution grid 27, and an AC load 30 to which AC power is supplied is connected to the AC power distribution grid 28. In the drawing, these loads are shown collectively, but as a matter of course, they may be connected as several separate loads or may be connected via transformers. The DC load 29 and the AC load 30 are not limited to the one that consumes power, but may be the one that generates regenerative power, such as an electric motor, or the one that includes a storage battery or a small-scale electric generation system of various types.

Figure 2:
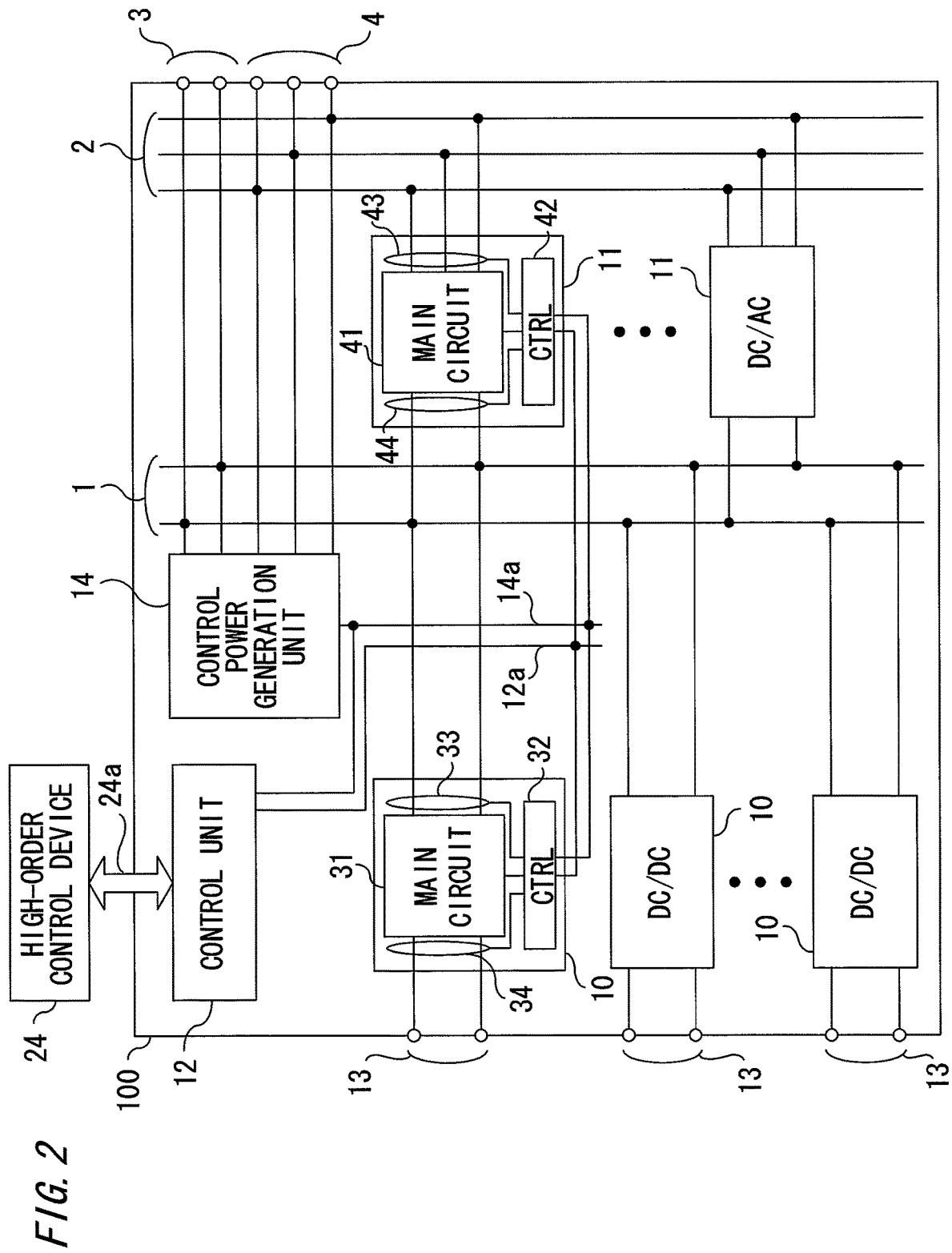
FIG. 2 is a configuration diagram of the power conversion device according to embodiment 1 of the present invention.

FIG. 2 is a diagram showing the detailed configuration of the power conversion device 100.

As shown in FIG. 2, the power conversion device 100 includes a control power generation unit 14. The control power generation unit 14 supplies control power to the DC/DC converters 10, the DC/AC converters 11, and the control unit 12 via a power line 14a. The control power generation unit 14 is supplied with power from the common DC buses 1 and the AC buses 2. Thus, during a period in which power can be supplied from at least either the common DC buses 1 or the AC buses 2, control power can be supplied from the control power generation unit 14.

The power may be supplied from only the common DC buses 1 or only the AC buses 2, or may be supplied from power lines near the DC connection terminals 3 and the AC connection terminals 4. Alternatively, the power may be supplied by control power input terminals being provided to the power conversion device 100.

The control unit 12 transmits a power command 12a to each DC/DC converter 10 and each DC/AC converter 11. The power command 12a includes first power commands for the respective DC/DC converters 10 and second power commands for the respective DC/AC converters 11.

Next, the DC/DC converter 10 will be described in detail. The DC/DC converter 10 includes a main circuit unit 31, a control circuit 32 as a first converter control unit, and detectors 33, 34 respectively provided on the primary side and the secondary side of the DC/DC converter 10.

Figure 3:
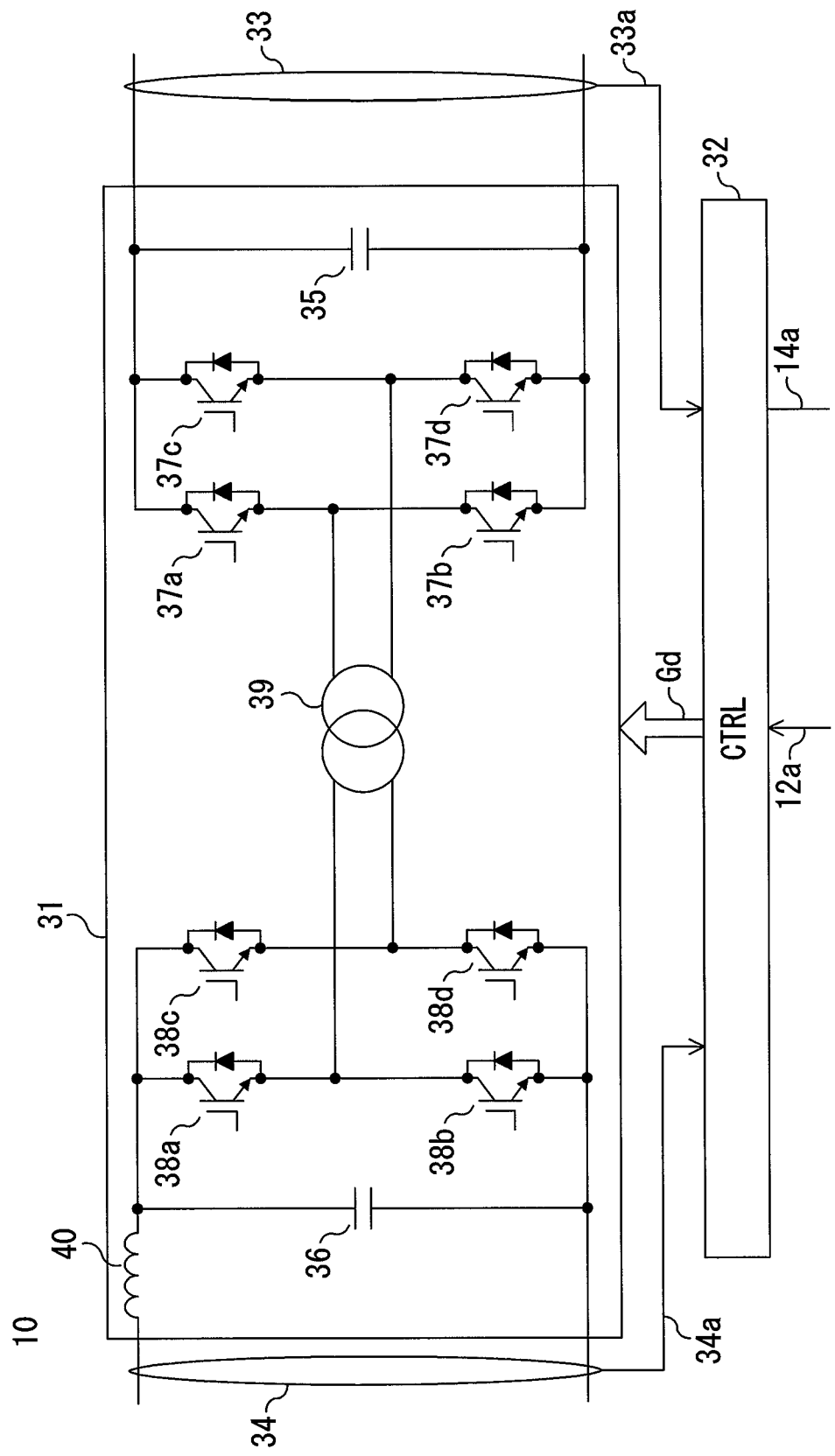
FIG. 3 is a configuration diagram of a DC/DC converter according to embodiment 1 of the present invention.

FIG. 3 is a diagram showing the detailed configuration of the DC/DC converter 10.

As shown in FIG. 3, the main circuit unit 31 includes a primary-side smoothing capacitor 35, a secondary-side smoothing capacitor 36, primary-side semiconductor switching elements 37a to 37d, secondary-side semiconductor switching elements 38a to 38d, a high-frequency transformer 39, and a filter reactor 40. The semiconductor switching elements 37a to 37d, 38a to 38d are formed from insulated gate bipolar transistors (IGBT) to which diodes are connected in antiparallel. As a matter of course, the semiconductor switching elements 37a to 37d, 38a to 38d may be other semiconductor elements such as metal-oxide-semiconductor field-effect transistors (MOSFET).

The primary-side smoothing capacitor 35 and the primary-side semiconductor switching elements 37a to 37d form a single-phase inverter, and the AC output thereof is connected to the primary side of the high-frequency transformer 39. The secondary-side smoothing capacitor 36 and the secondary-side semiconductor switching elements 38a to 38d also form a single-phase inverter, and the AC output thereof is connected to the secondary side of the high-frequency transformer 39. Thus, DC power is once converted to high-frequency AC power, which is then isolated by the high-frequency transformer 39, and thereafter, the AC power can be converted to DC power again. The filter reactor 40 suppresses harmonics that are to flow into the DC distributed power supply 25, 26.

In this case, power conversion is performed using leakage inductance of the high-frequency transformer 39. However, reactors may be additionally provided to the primary side and the secondary side of the high-frequency transformer 39.

By using the main circuit unit 31 as described above, it is possible to convert power in both directions irrespective of the magnitude relationship between the primary-side voltage and the secondary-side voltage.

The detector 33 on the primary side of the DC/DC converter 10 detects voltage and current on the primary side, and the detector 34 on the secondary side detects voltage and current on the secondary side. A detection value 33a outputted from the detector 33 and a detection value 34a outputted from the detector 34 are inputted to the control circuit 32 of the DC/DC converter 10. Using the power command 12a from the control unit 12 of the power conversion device 100 and the detection values 33a, 34a of the DC/DC converter 10, the control circuit 32 generates voltage signals Gd to be applied to the gates of the semiconductor switching elements 37a to 37d, 38a to 38d of the main circuit unit 31, thereby controlling the main circuit unit 31. In addition, the control circuit 32 also transmits the detection values 33a, 34a to the control unit 12 of the power conversion device 100.

The detection values 33a, 34a may be directly inputted to the control unit 12 of the power conversion device 100.

Figure 4:
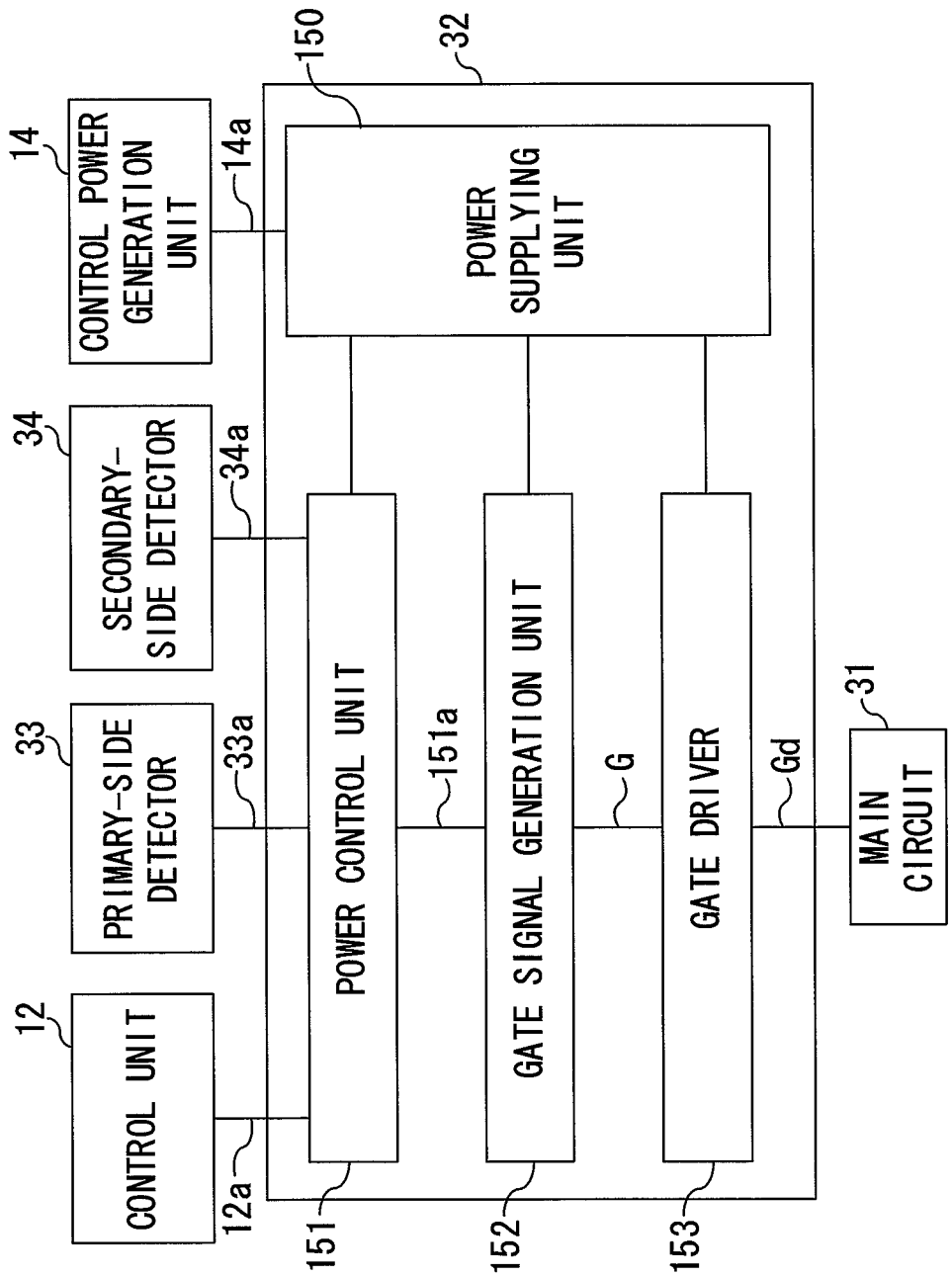
FIG. 4 is a configuration diagram of a control circuit of the DC/DC converter according to embodiment 1 of the present invention.

FIG. 4 is a diagram showing the configuration of the control circuit 32 of the DC/DC converter 10.

As shown in FIG. 4, the control circuit 32 includes a power supplying unit 150, a power control unit 151, a gate signal generation unit 152, and a gate driver 153. The control circuit 32 is supplied with power from the control power generation unit 14. The supplied power is isolated and converted to desired voltage by the power supplying unit 150, and then supplied to the power control unit 151, the gate signal generation unit 152, and the gate driver 153. The power may be collectively supplied to the power control unit 151 and the gate signal generation unit 152.

Instead of isolation at the power supplying unit 150, isolation and voltage conversion may be performed as necessary at the gate driver 153 or the like after the power is supplied.

The control circuit 32 can realize a function including the power control unit 151 and the gate signal generation unit 152 by having a circuit including a CPU, a memory, and an input/output interface.

The gate driver 153 includes gate drivers provided for the respective semiconductor switching elements 37a to 37d, 38a to 38d of the main circuit unit 31.

The power control unit 151 receives the first power command (power command value Pref) which is the power command 12a from the control unit 12, the detection value 33a from the detector 33 on the primary side, and the detection value 34a from the detector 34 on the secondary side.

A control output 151a from the power control unit 151 is inputted to the gate signal generation unit 152. The gate signal generation unit 152 generates the gate signals G for the semiconductor switching elements 37a to 37d, 38a to 38d of the main circuit unit 31 in accordance with the control output 151a, and gives the gate signals G to the gate driver 153. The gate driver 153 applies gate voltage (voltage signal Gd) between the gate and the emitter of each semiconductor switching element 37a to 37d, 38a to 38d.

The control circuit 32 of the DC/DC converter 10 also has some functions not shown in the drawing, e.g., transmitting the detection values 33a, 34a of the detectors 33, 34 to the control unit 12 of the power conversion device 100, detecting overvoltage or overcurrent, and giving all-gate shut-off signals for turning off all the semiconductor switching elements 37a to 37d, 38a to 38d, to the gate driver 153.

Figure 5:
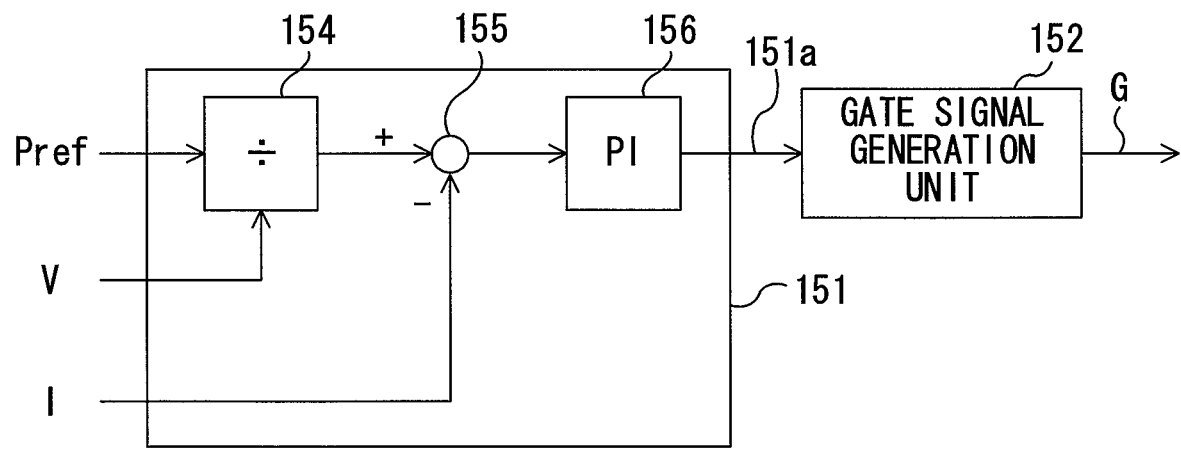
FIG. 5 is a configuration diagram of a power control unit in the control circuit of the DC/DC converter according to embodiment 1 of the present invention.

FIG. 5 is a block diagram showing a configuration example of the power control unit 151. A divider 154 divides the first power command Pref by a voltage detection value V. Output of the divider 154 corresponds to a current command value and is inputted to a subtractor 155. The subtractor 155 outputs a deviation between the inputted current command value and a current detection value I, and the deviation is inputted to a current controller (PI) 156. The current controller 156 is, for example, a proportional integral controller, and generates a control output 151a so that the inputted deviation becomes small, and the control output 151a is outputted from the power control unit 151. The control output 151a is, for example, a phase shift amount between the primary side and the secondary side.

The voltage detection value V and the current detection value I are the detection values 33a of the detector 33 on the primary side or the detection values 34a of the detector 34 on the secondary side of the DC/DC converter 10. If the detection values 33a are used, power on the primary side is to be controlled, and if the detection values 34a are used, power on the secondary side is to be controlled.

Next, the DC/AC converter 11 will be described in detail. As shown in FIG. 2, the DC/AC converter 11 includes a main circuit unit 41, a control circuit 42 as a second converter control unit, and detectors 43, 44 respectively provided on the primary side and the secondary side of the DC/AC converter 11.

Figure 6:
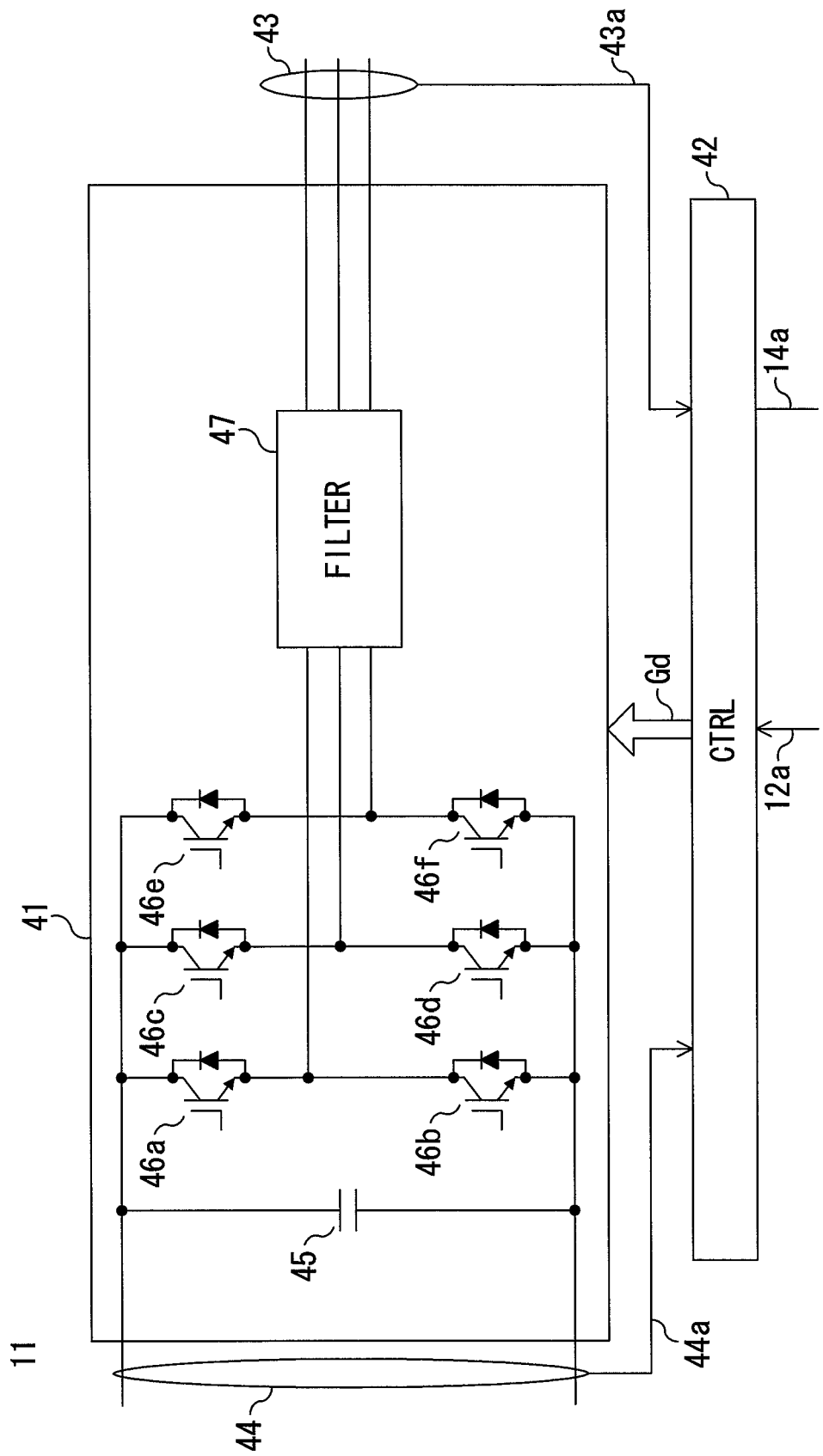
FIG. 6 is a configuration diagram of a DC/AC converter according to embodiment 1 of the present invention.

FIG. 6 is a diagram showing the detailed configuration of the DC/AC converter 11.

As shown in FIG. 6, the main circuit unit 41 includes a smoothing capacitor 45, semiconductor switching elements 46a to 46f, and an output filter 47.

The semiconductor switching elements 46a to 46f are formed from IGBTs to which diodes are connected in antiparallel. The semiconductor switching elements 46a to 46f may be other semiconductor elements such as MOSFETs.

Figure 7:
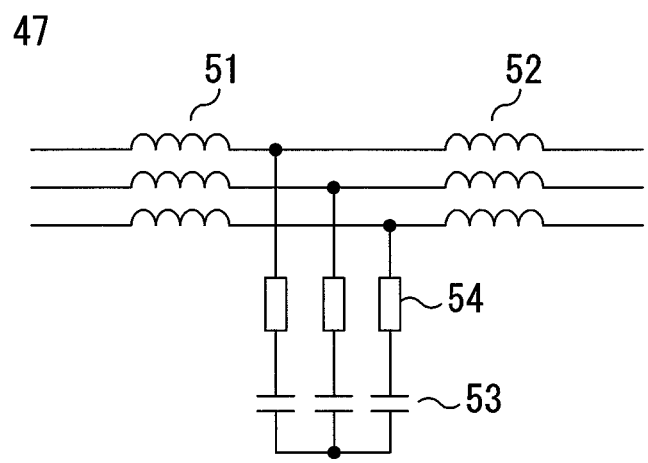
FIG. 7 is a configuration diagram of an output filter of the DC/AC converter according to embodiment 1 of the present invention.

The output filter 47 is subjected to a potential difference between output of the main circuit unit 41 and the AC buses 2, and removes high-frequency components due to switching of the semiconductor switching elements 46a to 46f. As shown in FIG. 7, for example, the output filter 47 includes AC reactors 51, filter reactors 52, filter capacitors 53, and damping resistors 54. The AC reactors 51 and the filter reactors 52 are connected to each other, the other ends of the AC reactors 51 are connected to the semiconductor switching elements 46a to 46f, and the other ends of the filter reactors 52 are connected to the AC buses 2.

By using the main circuit unit 41 as described above, it is possible to convert active power in both directions between the common DC buses 1 (DC) and the AC buses 2 (AC). In addition, it is also possible to supply reactive power to the AC buses 2. It is noted that, in order that current close to a sinewave flows on the primary side, it is necessary that voltage of the common DC buses 1 is greater than the amplitude of line-to-line voltage of the AC buses 2.

The detector 43 on the primary side of the DC/AC converter 11 detects voltage and current on the primary side. Since the primary side is an AC side, a detector for a power factor may be provided. The detector 44 on the secondary side of the DC/AC converter 11 detects voltage and current on the secondary side. The detection value 43a outputted from the detector 43 and the detection value 44a outputted from the detector 44 are inputted to the control circuit 42 of the DC/AC converter 11. Using the power command 12a from the control unit 12 of the power conversion device 100 and the detection values 43a, 44a of the DC/AC converter 11, the control circuit 42 generates voltage signals Gd to be applied to the gates of the semiconductor switching elements 46a to 46f of the main circuit unit 41, thereby controlling the main circuit unit 41. In addition, the control circuit 42 also transmits the detection values 43a, 44a to the control unit 12 of the power conversion device 100.

The detection values 43a, 44a may be directly inputted to the control unit 12 of the power conversion device 100.

Figure 8:
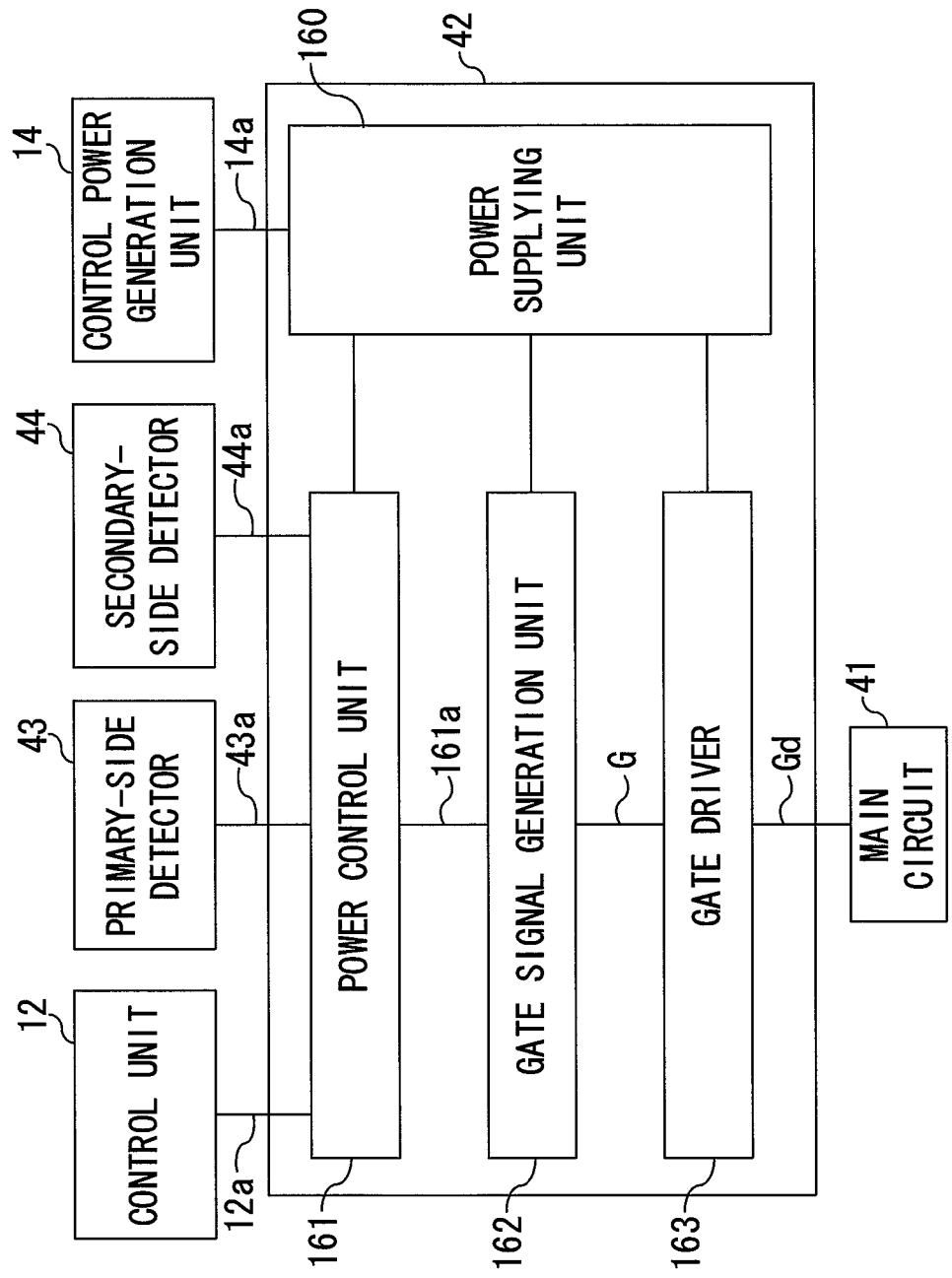
FIG. 8 is a configuration diagram of a control circuit of the DC/AC converter according to embodiment 1 of the present invention.

FIG. 8 is a diagram showing the configuration of the control circuit 42 of the DC/AC converter 11.

As shown in FIG. 8, the control circuit 42 includes a power supplying unit 160, a power control unit 161, a gate signal generation unit 162, and a gate driver 163. The control circuit 42 is supplied with power from the control power generation unit 14. The supplied power is isolated and converted to desired voltage by the power supplying unit 160, and then supplied to the power control unit 161, the gate signal generation unit 162, and the gate driver 163. The power may be collectively supplied to the power control unit 161 and the gate signal generation unit 162.

Instead of isolation at the power supplying unit 160, isolation and voltage conversion may be performed as necessary at the gate driver 163 or the like after the power is supplied.

The control circuit 42 can realize a function including the power control unit 161 and the gate signal generation unit 162 by having a circuit including a CPU, a memory, and an input/output interface.

The gate driver 163 includes gate drivers provided for the respective semiconductor switching elements 46a to 46f of the main circuit unit 41.

The power control unit 161 receives the second power command (active power command value Pref and reactive power command value Qref) which is the power command 12a from the control unit 12, the detection value 43a from the detector 43 on the primary side, and the detection value 44a from the detector 44 on the secondary side.

A control output 161a from the power control unit 161 is inputted to the gate signal generation unit 162. The gate signal generation unit 162 generates the gate signals G for the semiconductor switching elements 46a to 46f of the main circuit unit 41 in accordance with the control output 161a, and gives the gate signals G to the gate driver 163. The gate driver 163 applies gate voltage (voltage signal Gd) between the gate and the emitter of each semiconductor switching element 46a to 46f.

The control circuit 42 of the DC/AC converter 11 also has some functions not shown in the drawings, e.g., transmitting the detection values 43a, 44a of the detectors 43, 44 and the frequency and the power factor on the primary side to the control unit 12 of the power conversion device 100, detecting overvoltage or overcurrent, and giving all-gate shut-off signals for turning off all the semiconductor switching elements 46a to 46f, to the gate driver 163.

Figure 9:
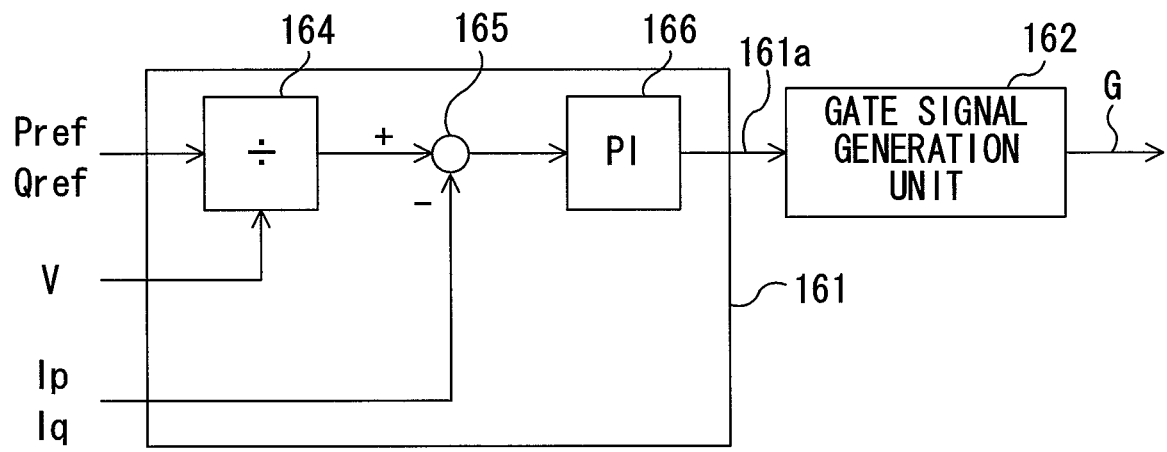
FIG. 9 is a configuration diagram of a power control unit in the control circuit of the DC/AC converter according to embodiment 1 of the present invention.

FIG. 9 is a block diagram showing a configuration example of the power control unit 161. A divider 164 divides the second power commands Pref, Qref by the voltage detection value V. Output of the divider 164 corresponds to an active current command value and a reactive current command value and is inputted to a subtractor 165. The subtractor 165 outputs deviations between: the inputted active current command value and the inputted reactive current command value; and an active current detection value Ip and a reactive current detection value Iq, and the deviations are inputted to a current controller (PI) 166. The current controller 166 is, for example, a proportional integral controller, and generates a control output 161a so that the inputted deviations become small, and the control output 161a is outputted from the power control unit 161. Normally, the control output 161a is an AC voltage command value.

Using the voltage detection value V and the current detection value I which are the detection values 43a of the detector 43 on the primary side of the DC/AC converter 11, the active current detection value Ip and the reactive current detection value Iq are calculated from the phase of the voltage detection value V and the current detection value I. As described above, the active power and the reactive power on the primary side are controlled using the voltage detection value V on the primary side, the active current detection value Ip, and the reactive current detection value Iq.

The gate signal generation unit 162 compares a triangular wave carrier and the AC voltage command value which is the control output 161a from the power control unit 161, and generates the gate signals G through pulse width modulation (PWM).

Figure 10:
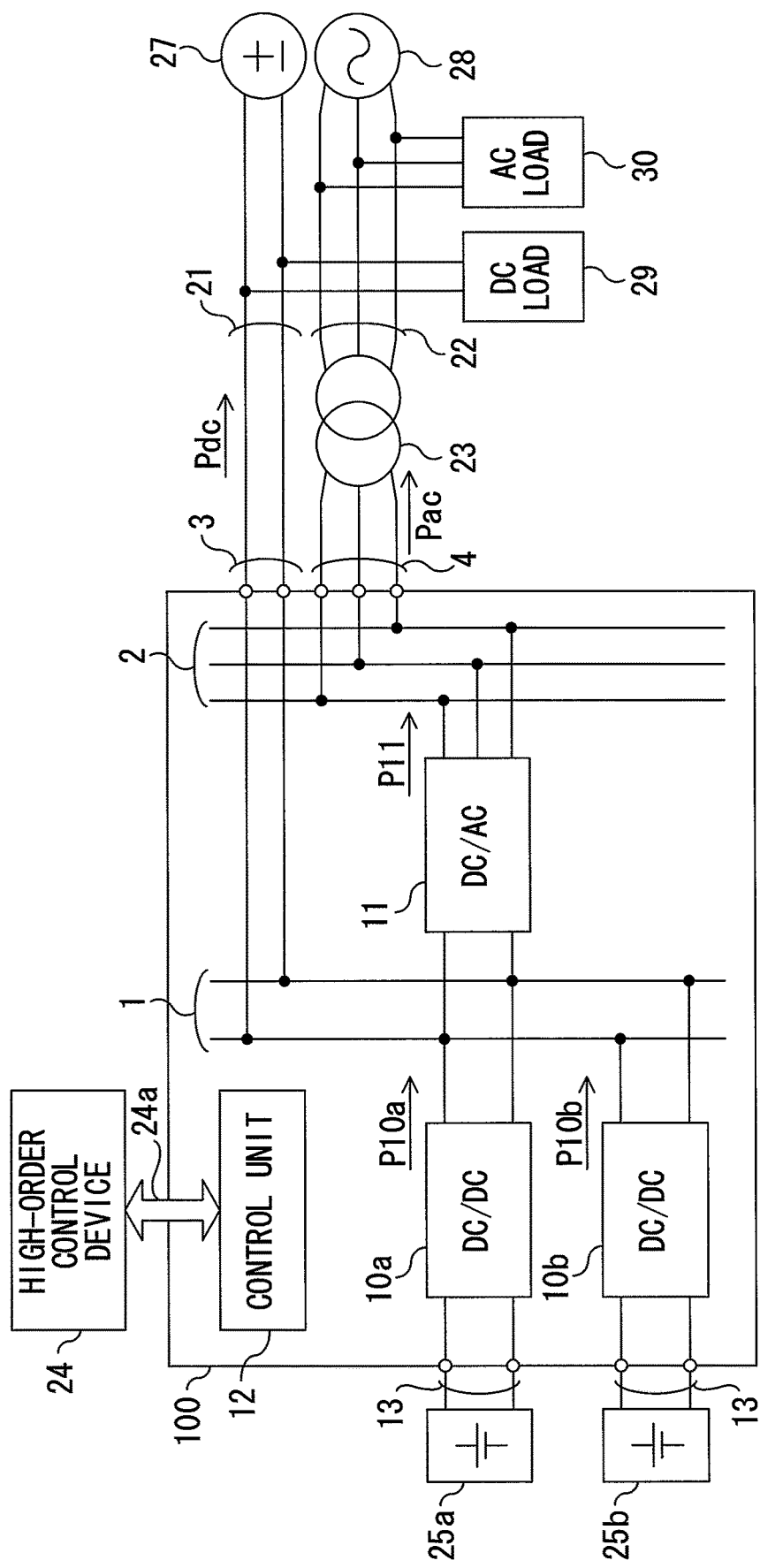
FIG. 10 is a diagram showing a configuration example for explaining operation of the power conversion device according to embodiment 1 of the present invention.

Next, the function and operation of the power conversion device 100 will be described. For simplification, as shown in FIG. 10, the power conversion device 100 is assumed to have two DC/DC converters 10 (10a, 10b) and one DC/AC converter 11, as an example. The DC/DC converters 10a, 10b are respectively connected to DC distributed power supplies 25a, 25b capable of charging and discharging.

Output powers of the DC/DC converters 10a, 10b are denoted by P10a, P10b, and output power of the DC/AC converter 11 is denoted by P11. As described above, the power polarity and the current polarity are defined such that the direction from the secondary side to the primary side is positive.

Output power from the DC connection terminals 3 is denoted by Pdc and output active power from the AC connection terminals 4 is denoted by Pac. In this case, reactive power is not outputted from the AC connection terminals 4. Therefore, in the control circuit 42 of the DC/AC converter 11, the reactive power command value Qref inputted to the power control unit 161 is zero.

The control unit 12 transmits the first power commands for the DC/DC converters 10a, 10b and the second power command for the DC/AC converter 11, which are the power commands 12a, to the DC/DC converters 10a, 10b and the DC/AC converter 11. In the present embodiment, the control unit 12 receives the first power commands for the DC/DC converters 10a, 10b and the second power command for the DC/AC converter 11 as the high-order control command 24a from the high-order control device 24, and the control unit 12 transmits the received first power commands and second power command to the DC/DC converters 10a, 10b and the DC/AC converter 11.

The power conversion device 100 has a plurality of operation modes for performing power transfer between the connection terminals, i.e., the DC connection terminals 3, the AC connection terminals 4, and the distributed power supply connection terminals 13 which are two pairs in this case, through operations of the DC/DC converters 10a, 10b and the DC/AC converter 11. The plurality of operation modes are: a first power transfer mode in which power is transferred between the distributed power supply connection terminals 13 and the DC connection terminals 3, a second power transfer mode in which power is transferred between the distributed power supply connection terminals 13 and the AC connection terminals 4, a third power transfer mode in which power is transferred between the DC connection terminals 3 and the AC connection terminals 4, and a fourth power transfer mode in which power is transferred between a plurality of the distributed power supply connection terminals 13.

Each operation mode is an operation mode in which power is transferred between the connection terminals via the common DC buses 1, and the four operation modes are determined so as to allow two or more of the operation modes to be combined at the same time.

Since the common DC buses 1 are directly connected to the DC connection terminals 3, excess and deficiency of power in the common DC buses 1 are covered by output power Pdc from the DC connection terminals 3.

That is, the sum of input and output of power in the common DC buses 1 relaying power transfer is zero. In the configuration shown in FIG. 10, the following is satisfied:

$$P10a+P10b-P11-Pdc=0.$$

First, regarding operation of the power conversion device 100, four cases (X-1, X-2, X-3, X-4) where the power conversion device 100 supplies power (10 kW) from the DC connection terminals 3 to the DC distribution lines 21 will be described below with reference to FIG. 11.

FIG. 11 shows power allocations at certain locations in the four cases (X-1, X-2, X-3, X-4). Under the assumption that an ideal operation is performed, P10a and P10b are the same as the first power commands for the DC/DC converters 10a, 10b, and P11 is the same as the second power command for the DC/AC converter 11.

In this case, Pdc is 10 kW. Further, Pac=ΣP11 is satisfied, and here, since one DC/AC converter 11 is present, Pac is P11.

In case X-1, the first power command (power command value Pref) of 5 kW is given to each DC/DC converter 10a, 10b, and the second power command (active power command value Pref) of 0 kW is given to the DC/AC converter 11. The control circuit 32 of each DC/DC converter 10a, 10b receives the power command value Pref (5 kW) and generates the gate signals G for the main circuit unit 31 so that power of 5 kW is discharged from each DC distributed power supply 25a, 25b to the common DC buses 1.

The control circuit 42 of the DC/AC converter 11 receives the active power command value Pref (0 kW) and generates the gate signals G for the main circuit unit 41 so that the main circuit unit 41 does not output active power to the AC buses 2. At this time, power of 5 kW is supplied from each DC distributed power supply 25a, 25b to the DC distribution lines 21.

In this case X-1, the power conversion device 100 operates by only the first power transfer mode in which power is transferred between the distributed power supply connection terminals 13 and the DC connection terminals 3. From each pair of the two pairs of distributed power supply connection terminals 13, power of 5 kW (i.e., a total of 10 kW) is transferred to the DC connection terminals 3.

In case X-2, the first power commands (power command values Pref) of 5 kW, 0 kW are given to the DC/DC converters 10a, 10b, and the second power command (active power command value Pref) of −5 kW is given to the DC/AC converter 11. In the DC/DC converter 10a, the control circuit 32 receives the power command value Pref (5 kW), and the control circuit 32 generates the gate signals G for the main circuit unit 31 so that power of 5 kW is discharged from the DC distributed power supply 25a to the common DC buses 1. In the DC/DC converter 10b, the control circuit 32 receives the power command value Pref (0 kW), and the control circuit 32 generates the gate signals G for the main circuit unit 31 so that the DC distributed power supply 25b does not perform charging/discharging.

The control circuit 42 of the DC/AC converter 11 receives the active power command value Pref (−5 kW), and generates the gate signals G for the main circuit unit 41 so that power is supplied from the AC buses 2 to the common DC buses 1. At this time, from each of the DC distributed power supply 25a and the AC distribution line 22, power of 5 kW is supplied to the DC distribution lines 21.

In this case X-2, the power conversion device 100 operates by a combination of the first power transfer mode in which power is transferred between the distributed power supply connection terminals 13 and the DC connection terminals 3, and the third power transfer mode in which power is transferred between the DC connection terminals 3 and the AC connection terminals 4. In the first power transfer mode, power of 5 kW is transferred from one pair of distributed power supply connection terminals 13 to the DC connection terminals 3, and in the third power transfer mode, power of 5 kW is transferred from the AC connection terminals 4 to the DC connection terminals 3. Thus, power of 10 kW in total is outputted from the DC connection terminals 3.

In case X-3, the first power command (power command value Pref) of 0 kW is given to each DC/DC converter 10a, 10b, and the second power command (active power command value Pref) of −10 kW is given to the DC/AC converter 11.

The control circuit 32 of each DC/DC converter 10a, 10b receives the power command value Pref (0 kW) and generates the gate signals G for the main circuit unit 31 so that each DC distributed power supply 25a, 25b does not perform charging/discharging.

The control circuit 42 of the DC/AC converter 11 receives the active power command value Pref (−10 kW) and generates the gate signals G for the main circuit unit 41 so that power is supplied from the AC buses 2 to the common DC buses 1. At this time, power of 10 kW is supplied from the AC distribution lines 22 to the DC distribution lines 21.

In this case X-3, the power conversion device 100 operates by only the third power transfer mode in which power is transferred between the DC connection terminals 3 and the AC connection terminals 4. In the third power transfer mode, power of 10 kW is transferred from the AC connection terminals 4 to the DC connection terminals 3. Thus, power of 10 kW in total is outputted from the DC connection terminals 3.

In case X-4, the first power commands (power command values Pref) of 5 kW, −5 kW are given to the DC/DC converters 10a, 10b, and the second power command (active power command value Pref) of −10 kW is given to the DC/AC converter 11. In the DC/DC converter 10a, the control circuit 32 receives the power command value Pref (5 kW), and the control circuit 32 generates the gate signals G for the main circuit unit 31 so that power of 5 kW is discharged from the DC distributed power supply 25a to the common DC buses 1. In the DC/DC converter 10b, the control circuit 32 receives the power command value Pref (−5 kW), and the control circuit 32 generates the gate signals G for the main circuit unit 31 so that the DC distributed power supply 25b is charged with 5 kW from the common DC buses 1.

The control circuit 42 of the DC/AC converter 11 receives the active power command value Pref (−10 kW) and generates the gate signals G for the main circuit unit 41 so that power is supplied from the AC buses 2 to the common DC buses 1.

At this time, power of 5 kW from the DC distributed power supply 25a and power of 10 kW from the AC distribution lines 22 are supplied to the common DC buses 1, and from the common DC buses 1, power of 5 kW is supplied to the DC distributed power supply 25b and power of 10 kW is supplied to the DC distribution lines 21.

In this case X-4, the power conversion device 100 operates by a combination of the third power transfer mode in which power is transferred between the DC connection terminals 3 and the AC connection terminals 4, and the fourth power transfer mode in which power is transferred between two pairs of distributed power supply connection terminals 13.

It is only required that the sum of input and output of the common DC buses 1 relaying power transfer is zero. Therefore, without limitation to the above combination of the operation modes, for example, it is possible to use a combination of the first power transfer mode in which power is transferred between the distributed power supply connection terminals 13 and the DC connection terminals 3, the second power transfer mode in which power is transferred between the distributed power supply connection terminals 13 and the AC connection terminals 4, and the third power transfer mode. Further, it is also possible to perform operation by a combination of the first power transfer mode, the second power transfer mode, the third power transfer mode, and the fourth power transfer mode.

Next, four cases (Y-1, Y-2, Y-3, Y-4) where the power conversion device 100 receives power (10 kW) from the AC distribution lines 22 via the AC connection terminals 4 will be described below with reference to FIG. 12.

FIG. 12 shows power allocations at certain locations in the four cases (Y-1, Y-2, Y-3, Y-4). In this case, P11=Pac=−10 kW is satisfied, and the second power command given to the DC/AC converter 11 is −10 kW. In addition, Pdc is determined by operations of the DC/DC converters 10a, 10b and the DC/AC converter 11.

In case Y-1, the first power command (power command value Pref) of −5 kW is given to each DC/DC converter 10a, 10b. The control circuit 32 of each DC/DC converter 10a, 10b generates the gate signals G for the main circuit unit 31 so that each DC distributed power supply 25a, 25b is charged with 5 kW from the common DC buses 1.

The control circuit 42 of the DC/AC converter 11 receives the active power command value Pref (−10 kW) and generates the gate signals G for the main circuit unit 41 so that power is supplied from the AC buses 2 to the common DC buses 1.

At this time, power of 10 kW supplied from the AC distribution lines 22 is supplied as 5 kW to each DC distributed power supply 25a, 25b.

In this case Y-1, the power conversion device 100 operates by only the second power transfer mode in which power is transferred between the distributed power supply connection terminals 13 and the AC connection terminals 4.

In case Y-2, the first power commands (power command values Pref) of −5 kW, 0 kW are given to the DC/DC converters 10a, 10b. The control circuit 32 of the DC/DC converter 10a generates the gate signals G for the main circuit unit 31 so that the DC distributed power supply 25a is charged with 5 kW from the common DC buses 1. The control circuit 32 of the DC/DC converter 10b generates the gate signals G for the main circuit unit 31 so that the DC distributed power supply 25b does not perform charging/discharging. Operation of the DC/AC converter 11 is the same as in case Y-1.

At this time, power of 10 kW is supplied from the AC distribution lines 22 to the common DC buses 1. From the common DC buses 1, power of 5 kW is supplied to the DC distributed power supply 25a, and the remaining power of 5 kW is supplied to the DC distribution lines 21.

In this case Y-2, the power conversion device 100 operates by a combination of the second power transfer mode in which power is transferred between the distributed power supply connection terminals 13 and the AC connection terminals 4, and the third power transfer mode in which power is transferred between the DC connection terminals 3 and the AC connection terminals 4.

In case Y-3, the first power command (power command value Pref) of 0 kW is given to each DC/DC converter 10a, 10b. This case Y-3 is the same as the above case X-3. The power conversion device 100 operates by only the third power transfer mode in which power is transferred between the DC connection terminals 3 and the AC connection terminals 4, and power of 10 kW is supplied from the AC distribution lines 22 to the DC distribution lines 21.

In case Y-4, the first power commands (power command values Pref) of −5 kW, 5 kW are given to the DC/DC converters 10a, 10b. The control circuit 32 of the DC/DC converter 10a generates the gate signals G for the main circuit unit 31 so that the DC distributed power supply 25a is charged with 5 kW from the common DC buses 1. The control circuit 32 of the DC/DC converter 10b generates the gate signals G for the main circuit unit 31 so that power of 5 kW is discharged from the DC distributed power supply 25b to the common DC buses 1. Operation of the DC/AC converter 11 is the same as in case Y-1.

At this time, power of 10 kW from the AC distribution lines 22 and power of 5 kW from the DC distributed power supply 25b are supplied to the common DC buses 1. From the common DC buses 1, power of 5 kW is supplied to the DC distributed power supply 25a, and the remaining power of 10 kW is supplied to the DC distribution lines 21.

Also in this case Y-4, as in the above case X-4, the power conversion device 100 operates by a combination of the third power transfer mode and the fourth power transfer mode in which power is transferred between two pairs of distributed power supply connection terminals 13. Alternatively, a combination of the first power transfer mode, the second power transfer mode, and the third power transfer mode may be used, or it is also possible to perform operation by a combination of the first power transfer mode, the second power transfer mode, the third power transfer mode, and the fourth power transfer mode.

Next, two cases (Z-1, Z-2) where the power conversion device 100 supplies power of 10 kW in total to both of the DC distribution lines 21 and the AC distribution lines 22, or receives power of 10 kW in total from both, will be described below with reference to FIG. 13.

FIG. 13 shows power allocations at certain locations in the two cases (Z-1, Z-2). It is noted that P11=Pac is satisfied, and Pac and Pdc have the same polarity. In case Z-1, the power conversion device 100 supplies power of 10 kW in total to both of the DC distribution lines 21 and the AC distribution lines 22. The first power command (power command value Pref) of 5 kW is given to each DC/DC converter 10a, 10b, and the second power command (active power command value Pref) of 3 kW is given to the DC/AC converter 11. The control circuit 32 of each DC/DC converter 10a, 10b generates the gate signals G for the main circuit unit 31 so that power of 5 kW is discharged from each DC distributed power supply 25a, 25b to the common DC buses 1. The control circuit 42 of the DC/AC converter 11 generates the gate signals G for the main circuit unit 41 so that power is supplied from the common DC buses 1 to the AC buses 2.

At this time, power of 5 kW is supplied from each DC distributed power supply 25a, 25b to the common DC buses 1. From the common DC buses 1, power of 3 kW is supplied to the AC distribution lines 22, and the remaining power of 7 kW is supplied to the DC distribution lines 21.

In this case Z-1, the power conversion device 100 operates by a combination of the first power transfer mode and the second power transfer mode.

In case Z-2, the power conversion device 100 receives power of 10 kW in total from both of the DC distribution lines 21 and the AC distribution lines 22. The first power command (power command value Pref) of −5 kW is given to each DC/DC converter 10a, 10b, and the second power command (active power command value Pref) of −7 kW is given to the DC/AC converter 11. The control circuit 32 of each DC/DC converter 10a, 10b generates the gate signals G for the main circuit unit 31 so that each DC distributed power supply 25a, 25b is charged with 5 kW from the common DC buses 1. The control circuit 42 of the DC/AC converter 11 generates the gate signals G for the main circuit unit 41 so that power is supplied from the AC buses 2 to the common DC buses 1.

At this time, power of 5 kW is supplied to each DC distributed power supply 25a, 25b from the common DC buses 1. To the common DC buses 1, power of 7 kW is supplied from the AC distribution lines 22 and power of 3 kW for deficiency is supplied from the DC distribution lines 21.

Also in the case Z-2, the power conversion device 100 operates by a combination of the first power transfer mode and the second power transfer mode.

In FIG. 11 to FIG. 13, the case where the power conversion device 100 performs power transfer to/from at least either the DC distribution lines 21 or the AC distribution lines 22, has been described. The case of performing operation by only the fourth power transfer mode in which power transfer to/from the DC distribution lines 21 and the AC distribution lines 22 is not performed, is shown below.

The first power commands (power command values Pref) of 5 kW, −5 kW are given to the DC/DC converters 10a, 10b, and the second power command (active power command value Pref) of 0 W is given to the DC/AC converter 11. At this time, the DC distributed power supply 25b is charged with power of 5 kW discharged from the DC distributed power supply 25a.

As described above, output powers of the DC/DC converters 10a, 10b and the DC/AC converter 11 are subjected to output control using the first power commands and the second power command, whereby power transfer can be performed in various manners by the first to fourth power control modes.

In the above operations, power imbalance caused by power control error or conversion loss in the DC/DC converters 10 and the DC/AC converters 11 are not taken into consideration. In this regard, for example, in the case where the value of Pdc is smaller than the assumed value, the power command values Pref for the DC/DC converters 10a, 10b may be increased. Thus, an amount for compensating the power imbalance may be superimposed on each power command value Pref for the DC/DC converters 10a, 10b and the DC/AC converter 11.

In the case where both of the DC power distribution grid 27 and the AC power distribution grid 28 are present in the power distribution grid of the consumer, there are three types of power reception methods in the power conversion device 100, i.e., reception by only AC power, reception by only DC power, and reception by both AC power and DC power. The AC power reception is widely used.

Figure 14:
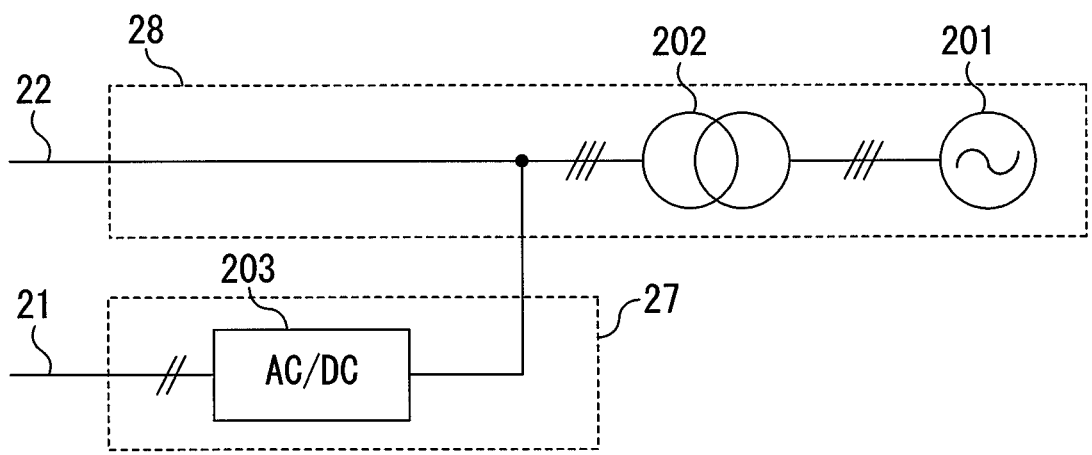
FIG. 14 illustrates AC power reception by the power conversion device according to embodiment 1 of the present invention.

FIG. 14 is a diagram showing an example of AC power reception by the power conversion device 100.

As shown in FIG. 14, the AC power distribution grid 28 is composed of an AC power transmission grid 201 and a transformer 202.

The power conversion device 100 receives power from the AC power transmission grid 201 via the transformer 202. In this case, a power line on the secondary side of the transformer 202 is defined as AC distribution line 22. The secondary side of the transformer 202 may be branched or the transformer 23 shown in FIG. 1 may be connected to the secondary side.

An AC/DC converter 203 is connected to the secondary side of the transformer 202, and a power line on the DC side of the AC/DC converter 203 is defined as DC distribution line 21. That is, the AC/DC converter 203 can be regarded as corresponding to the DC power distribution grid 27.

In the above configuration, the AC/DC converter 203 is provided so as to have a device capacity in accordance with the capacity of the DC load (including a distributed power supply) 29 connected to the DC distribution line 21, and the DC power distribution grid 27 is subordinate to the AC power distribution grid 28.

At this time, for example, through operation in the above case X-3, the DC/AC converter 11 of the power conversion device 100 can be used as an aid for the AC/DC converter 203.

In recent years, DC power transmission grids are widely spreading, and there are increasing cases where DC power transmission is applied to long-distance power transmission and power transmission from a wind electric generation plant on the ocean to a consumer area. Therefore, in particular, technology of DC power reception by the power conversion device 100 is important in a power plant/substation, the surrounding facility thereof, and the like.

Figure 15:
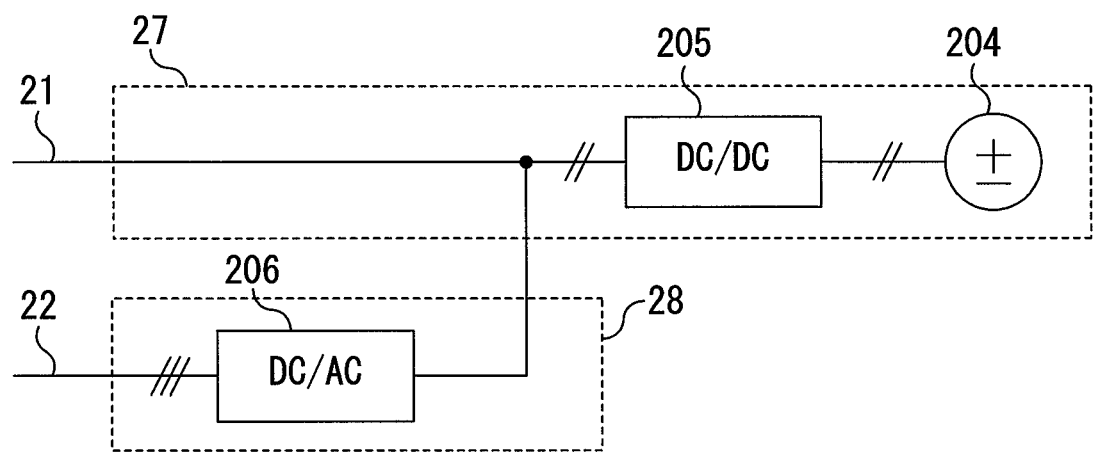
FIG. 15 illustrates DC power reception by the power conversion device according to embodiment 1 of the present invention.

FIG. 15 is a diagram showing an example of DC power reception by the power conversion device 100.

As shown in FIG. 15, the DC power distribution grid 27 is composed of a DC power transmission grid 204 and a DC/DC converter 205.

The power conversion device 100 receives power from the DC power transmission grid 204 at high voltage via the DC/DC converter 205. The secondary side of the DC/DC converter 205 is at low voltage and is connected to the DC distribution line 21. The secondary side of the DC/DC converter 205 is also connected to a DC/AC converter 206, and a power line on the AC side of the DC/AC converter 206 is defined as AC distribution line 22. That is, the DC/AC converter 206 can be regarded as corresponding to the AC power distribution grid 28.

Here, the case where low-voltage DC power is inputted to the DC/AC converter 206 is shown. However, a configuration in which power can be directly inputted from the high-voltage DC power transmission grid 204 to the DC/AC converter 206, may be employed.

In the case where the DC power transmission grid 204 supplies low-voltage DC power, the DC/DC converter 205 need not be provided.

In the above configuration, the DC/AC converter 206 is provided so as to have a device capacity in accordance with the capacity of the AC load (including a distributed power supply) 30 connected to the AC distribution line 22, and the AC power distribution grid 28 is subordinate to the DC power distribution grid 27.

In this case, for example, if the power conversion device 100 is operated with the first power command of 0 kW given to each DC/DC converter 10a, 10b and the second power command of −10 kW given to the DC/AC converter 11, power of 10 kW supplied from the DC distribution line 21 is supplied to the AC distribution line 22, and thus the DC/AC converter 11 of the power conversion device 100 can be used as an aid for the DC/AC converter 206.

Next, the case of receiving power from both of the AC power transmission grid and the DC power transmission grid will be described.

In this case, if one of the power transmission grids falls into power outage, the power-outage power transmission grid is disconnected, and then power can be received from the other power transmission grid within the capacity of the DC/AC converter 11.

In the case where the AC power transmission grid falls into power outage, the AC power distribution grid 28 is disconnected, and power needed for the AC load 30 is given as the second power command to the DC/AC converter 11. For example, if power of 5 kW is needed, the second power command for the DC/AC converter 11 is set at 5 kW.

In the case where the DC power transmission grid falls into power outage, the DC power distribution grid 27 is disconnected, and the first power commands and the second power command for the DC/DC converters 10a, 10b and the DC/AC converter 11 are determined and given so that power needed for the DC load 29 can be supplied to the DC distribution line 21. For example, if power of 5 kW is needed, the first power command for each DC/DC converter 10a, 10b is set at 0 kW, and the second power command for the DC/AC converter 11 is set at −5 kW. Alternatively, the first power commands for the respective DC/DC converters 10a, 10b may be set at 5 kW, 0 kW, and the second power command for the DC/AC converter 11 may be set at 0 kW.

As described above, in the present embodiment, the power conversion device 100 includes: the common DC buses 1; the AC buses 2; the DC connection terminals 3, the AC connection terminals 4, and the N pairs of distributed power supply connection terminals 13, which serve as connection terminals to outside; the N DC/DC converters 10; the M DC/AC converters 11; and the control unit 12. Thus, the plurality of DC distributed power supplies 25, 26 can be collectively connected to the DC power distribution grid 27 and the AC power distribution grid 28. In this power conversion device 100, the plurality of DC/DC converters 10 and the DC/AC converters 11 are each configured as a unit. Therefore, it is possible to change the number of the connected units in accordance with the configurations of the DC distributed power supplies 25, 26, or replace only a relevant unit in the case of unit failure.

On the basis of the high-order control command 24a from the high-order control device 24, the control unit 12 gives the power commands 12a (first power commands and second power commands) to the DC/DC converters 10 and the DC/AC converters 11, and each converter 10, 11 can output power in accordance with the power command. Thus, it is possible to perform power transfer between the distributed power supply connection terminals 13 and the DC connection terminals 3, between the distributed power supply connection terminals 13 and the AC connection terminals 4, between the DC connection terminals 3 and the AC connection terminals 4, and between a plurality of the distributed power supply connection terminals 13. That is, it is possible to perform mutual power transfer between each DC distributed power supply 25, 26 and the DC power distribution grid 27, between each DC distributed power supply 25, 26 and the AC power distribution grid 28, between the DC power distribution grid 27 and the AC power distribution grid 28, and between a plurality of the DC distributed power supplies 25, 26, whereby power can be interchanged, and further, it is possible to perform operation while combining the above power transfer patterns at the same time.

In the power conversion device 100, power can be transferred via the common DC buses 1 and the AC buses 2 between the DC power distribution grid 27 and the AC power distribution grid 28, not via the DC distributed power supplies 25, 26. Thus, it becomes possible to perform power control with efficiency and a high degree of freedom.

The power conversion device 100 can be used for a virtual power plant (VPP) having a small-scale DC distributed power supply, whereby generated power of renewable energy can be leveled and grid stabilization can be facilitated. The power conversion device 100 is suitable for changing power to be supplied to the DC power distribution grid 27 and the AC power distribution grid 28 as appropriate in accordance with change in load characteristics and electric generation characteristics at a consumer, and thus is effective for saving the amount of received power.

Embodiment 2

Next, a power conversion device according to embodiment 2 of the present invention will be described.

In the present embodiment 2, the configurations of the control circuits 32, 42 of the DC/DC converter 10 and the DC/AC converter 11 are different from those of the above embodiment 1.

Figure 16:
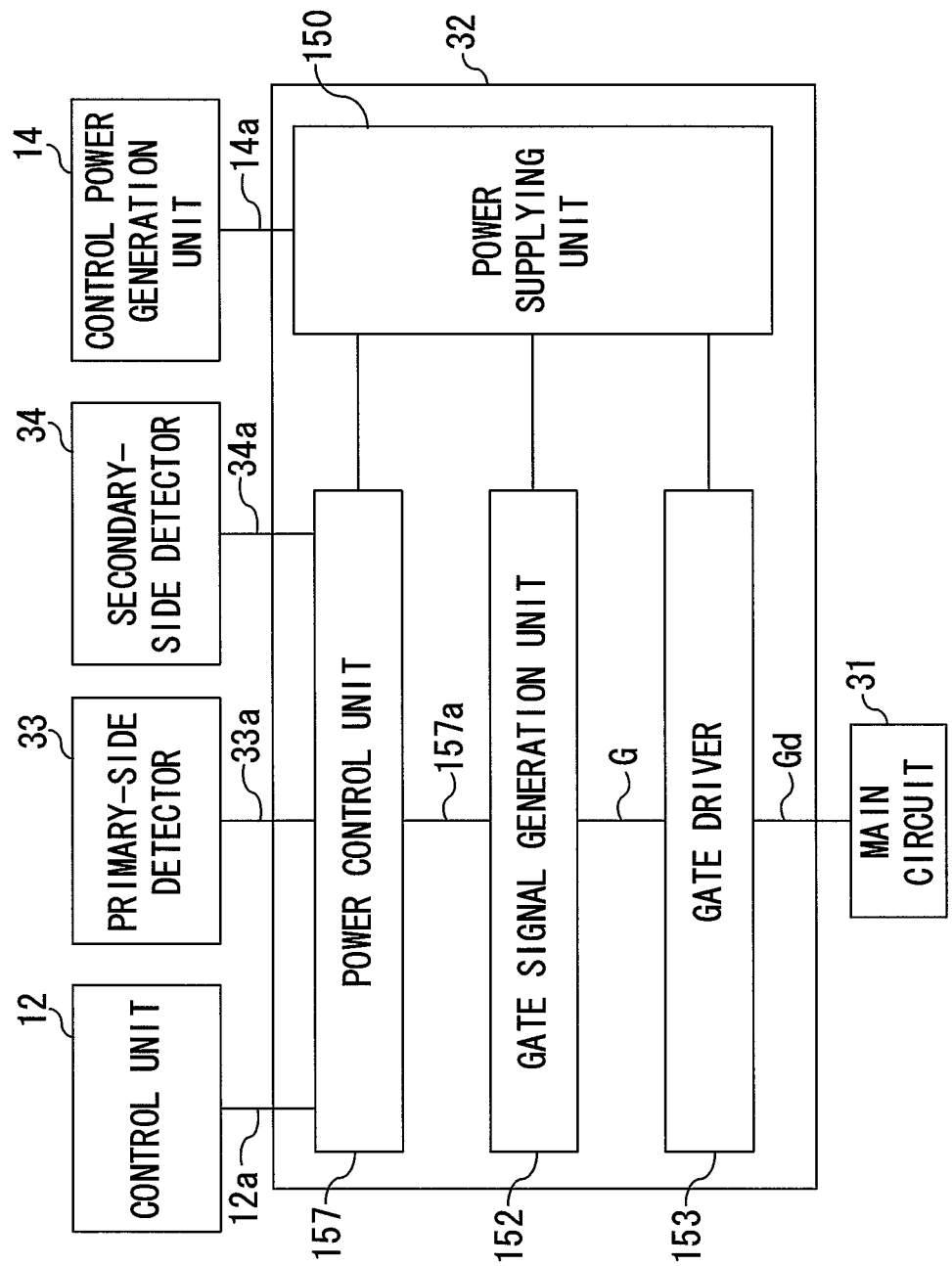
FIG. 16 is a configuration diagram of a control circuit of a DC/DC converter according to embodiment 2 of the present invention.

FIG. 16 is a diagram showing the configuration of the control circuit 32 of the DC/DC converter 10 according to embodiment 2 of the present invention. In this case, the DC distributed power supply 25 capable of charging and discharging is connected to the DC/DC converter 10. Here, parts different from embodiment 1 will be mainly described, while description of the same parts as in embodiment 1 is omitted as appropriate.

As shown in FIG. 16, the control circuit 32 includes the power supplying unit 150, a power control unit 157, the gate signal generation unit 152, and the gate driver 153. The power supplying unit 150, the gate signal generation unit 152, and the gate driver 153 are the same as those in the above embodiment 1, but the power control unit 157 is different.

As in the above embodiment 1, the first power command (power command value Pref) which is the power command 12a from the control unit 12, the detection value 33a from the detector 33 on the primary side, and the detection value 34a from the detector 34 on the secondary side, are given to the power control unit 157. A control output 157a from the power control unit 157 is inputted to the gate signal generation unit 152.

In this case, the first power command Pref corrected in accordance with change in primary-side voltage Vdc which is the detection value 33a on the primary side is used. That is, the output power of the DC/DC converter 10 is corrected. Main reasons why correction of the output power is needed are the following two reasons. The first reason is to suppress deviation of the primary-side voltage Vdc of the DC/DC converter 10 from a reference value, and the DC distributed power supply 25 is charged/discharged in the suppression direction. The second reason is to adjust power allocations in consideration with converter loss and detection error in the DC/DC converter 10 and further, converter loss and error in other DC/DC converters 10 and DC/AC converters 11.

Figure 17:
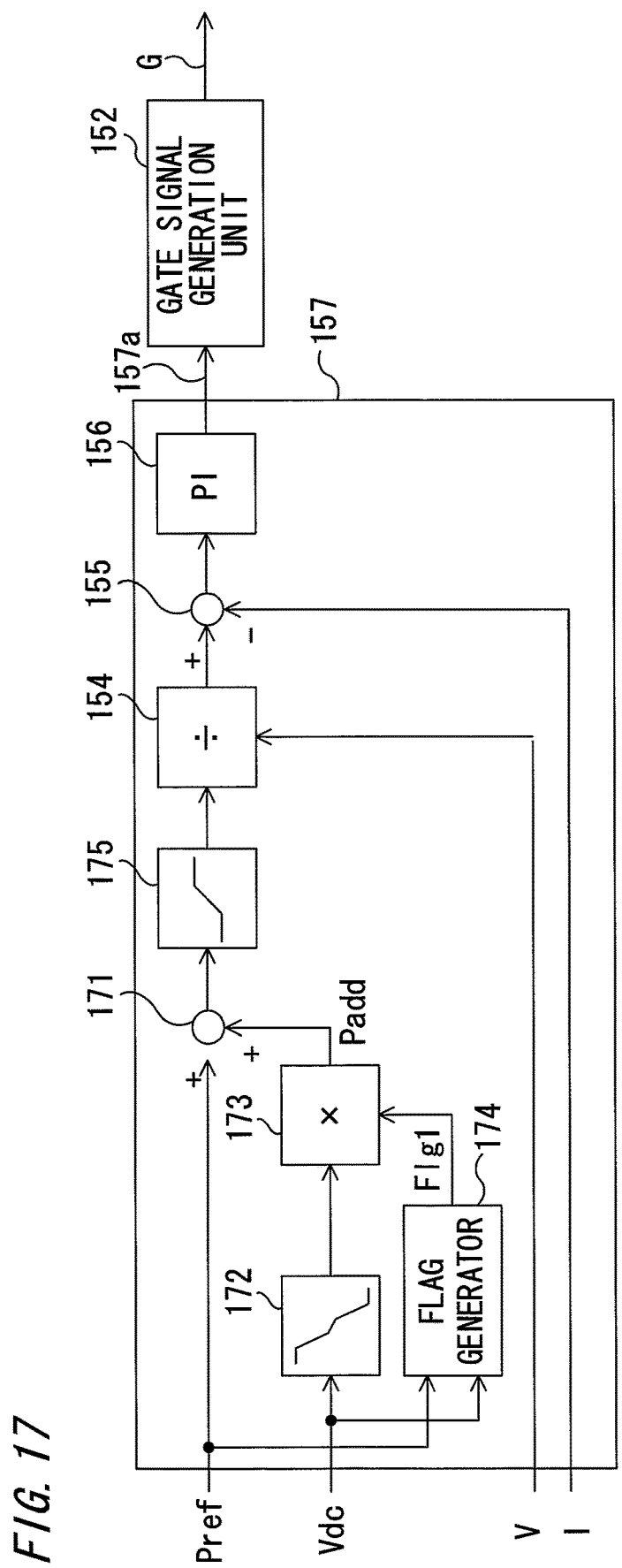
FIG. 17 is a configuration diagram of a power control unit in the control circuit of the DC/DC converter according to embodiment 2 of the present invention.

FIG. 17 is a block diagram showing the configuration of the power control unit 157.

As shown in FIG. 17, the first power command Pref is corrected by an adder 171 adding a correction amount Padd thereto. The corrected first power command Pref is limited to a value not greater than the converter rated power of the DC/DC converter 10 by a limiter 175, and then is inputted to a divider 154.

The primary-side voltage Vdc which is the detection value 33a on the primary side is inputted to a table 172 and a flag generator 174. The first power command Pref is also inputted to the flag generator 174.

Figure 18:
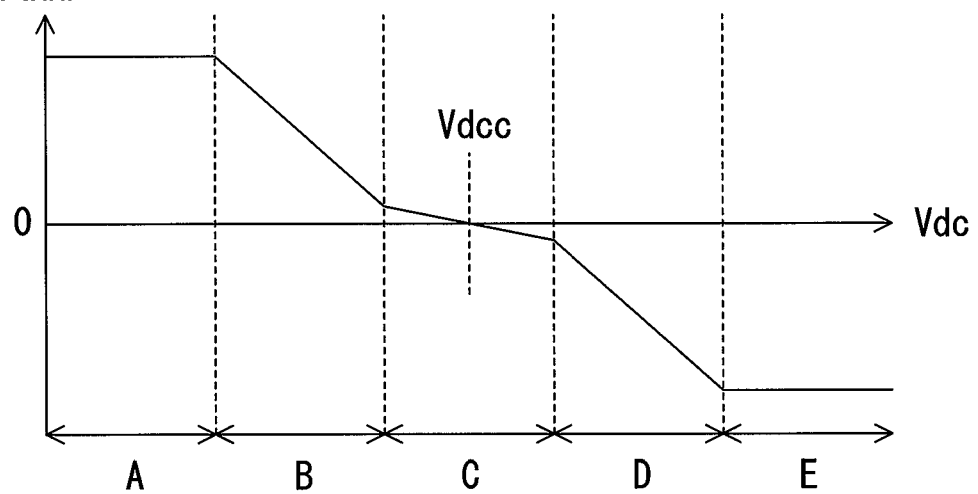
FIG. 18 illustrates correction of a power command of the DC/DC converter according to embodiment 2 of the present invention.

FIG. 18 shows the relationship between input and output of the table 172.

As shown in FIG. 18, the table 172 outputs a correction amount Padd* for correcting the first power command Pref in accordance with change in Vdc. The values of Vdc are divided into five regions A to E in the increasing order of Vdc, and the correction amount Padd* is determined accordingly. Normally, Vdc is within the center region C, and the median value (reference value) in the region C is denoted by Vdcc.

In this case, if Vdc coincides with Vdcc, Padd* is zero. As Vdc increases, Padd* gradually decreases (negative value), and as Vdc decreases, Padd* gradually increases (positive value). In the region C, Padd* is a small correction amount approximately corresponding to compensation for converter loss. This region C may be set as a dead zone, in which Padd*=0 is satisfied.

As Vdc is separated from Vdcc, the absolute value of Padd* increases. When Vdc is separated and enters the region B or the region D, the slope of Padd* becomes greater than in the region C. In the region D in which Vdc is great, Padd* is set to a negative value so as to perform control in a direction to charge the DC distributed power supply 25. In the region B in which Vdc is small, Padd* is set to a positive value so as to perform control in a direction to discharge the DC distributed power supply 25.

When Vdc is further separated from Vdcc and enters the region A or the region E, the absolute value of Padd* cannot be increased because of the converter rated capacity, and thus Padd* becomes constant.

If Vdc exceeds the upper or lower limit of the operating range of the DC/DC converter 10, all the gate signals G are turned off so as to stop charging/discharging.

In FIG. 18, the characteristics are set to have symmetry with respect to Vdcc. However, the characteristics are not limited thereto. The slope may be different between the region B and the region D, or the region widths may be different from each other.

The flag generator 174 receives the first power command Pref and the primary-side voltage Vdc and outputs a flag Flg1 indicating 0 or 1. In the flag generator 174, lower limit values Pmin, Vdifmin are set for the magnitude |Pref| of the first power command Pref and the voltage change width |Vdc−Vdcc| of the primary-side voltage Vdc, respectively. The flag generator 174 outputs Flg1 such that, if |Pref|<Pmin and |Vdc−Vdcc|<Vdifmin are satisfied, Flg1 is set to 0, and otherwise, Flg1 is set to 1, on the basis of the received first power command Pref and primary-side voltage Vdc.

The value of Pmin is close to zero and is sufficiently smaller than the rated power of the DC/DC converter 10, and the value of Vdifmin is half the width of the region C.

The Flg1 is used for preventing the DC distributed power supply 25 from being charged/discharged due to correction of the first power command Pref in the case where Vdc is within the region C and the DC distributed power supply 25 is hardly charged/discharged.

A multiplier 173 multiplies the correction amount Padd* outputted from the table 172 by the flag Flg1, thereby generating the correction amount Padd.

Then, as described above, the adder 171 adds the correction amount Padd to the first power command Pref, and the resultant value is limited by the limiter 175 and then inputted to the divider 154. Then, output of the limiter 175 is divided by the voltage detection value V in the divider 154. Output of the divider 154 corresponds to a current command value and is inputted to a subtractor 155. The subtractor 155 outputs a deviation between the inputted current command value and an inputted current detection value I, and the deviation is inputted to a current controller (PI) 156. The current controller 156 is, for example, a proportional integral controller, and generates and outputs a control output 157a so that the inputted deviation becomes small.

The voltage detection value V and the current detection value I are the detection values 33a of the detector 33 on the primary side or the detection values 34a of the detector 34 on the secondary side of the DC/DC converter 10. If the detection values 33a on the primary side are used, the voltage detection value V becomes the same value as Vdc.

As described above, in the present embodiment, the power control unit 157 in the control circuit 32 of the DC/DC converter 10 not only operates in accordance with the first power command Pref given from the control unit 12 but also performs the following operation. That is, the power control unit 157 operates such that, if the primary-side voltage Vdc deviates from the reference value, the first power command Pref is corrected so as to cause Vdc to approach the reference value.

In this case, since the correction amount Padd is calculated using the table 172, table data is stored in a memory (not shown). Instead of using the table 172, the correction amount Padd may be calculated by another method, e.g., using a calculation formula.

In the power control unit 157 described above, for example, if Vdc is reduced when the first power command Pref is negative and the DC distributed power supply 25 is being charged, the positive correction amount Padd is canceled by the negative first power command Pref and thus discharge is suppressed. That is, control is performed with low priority given on suppression of change in the primary-side voltage Vdc, i.e., voltage maintenance.

Figure 19:
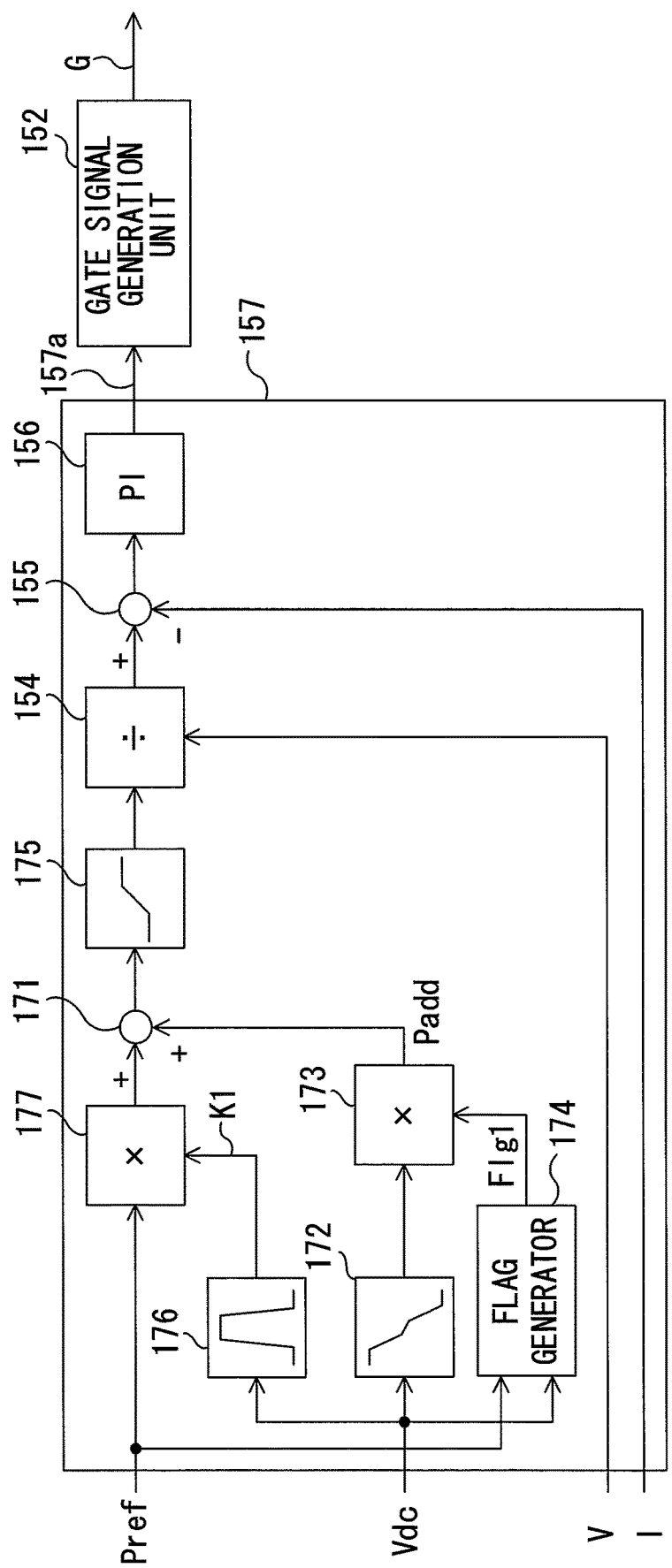
FIG. 19 is a configuration diagram of a power control unit in the control circuit of the DC/DC converter in another example according to embodiment 2 of the present invention.

The power control unit 157 may be configured as shown in FIG. 19, and in this control configuration, priority of voltage maintenance of the primary-side voltage Vdc is high.

The power control unit 157 shown in FIG. 19 is obtained by adding a table 176 and a multiplier 177 to the power control unit 157 shown in FIG. 17.

As shown in FIG. 19, the first power command Pref is multiplied by a gain K1 in the multiplier 177 and then the correction amount Padd is added thereto in the adder 171, whereby the first power command Pref is corrected.

The primary-side voltage Vdc which is the detection value 33a on the primary side is inputted to the table 172, the flag generator 174, and the table 176. The first power command Pref is also inputted to the flag generator 174.

Figure 20:
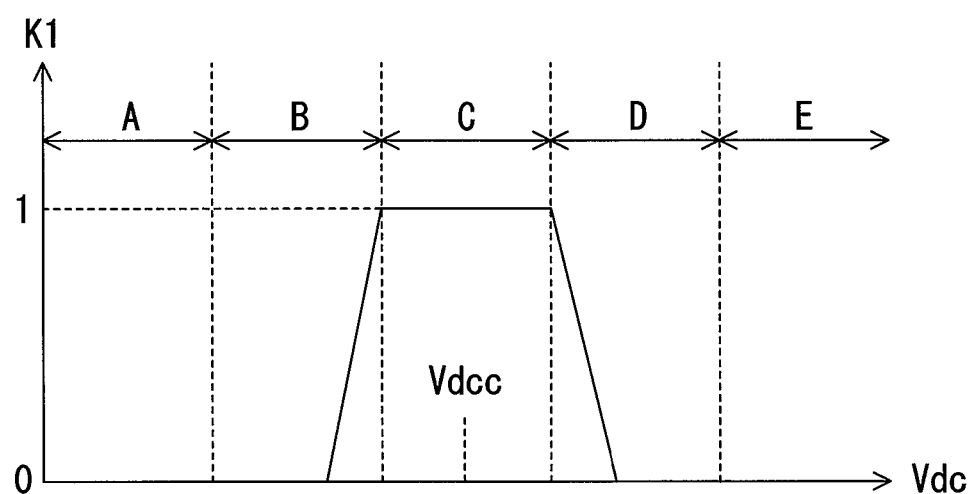
FIG. 20 illustrates correction of a power command of the DC/DC converter in another example according to embodiment 2 of the present invention.

FIG. 20 shows the relationship between input and output of the table 176.

As shown in FIG. 20, the table 176 outputs a gain K1 to be multiplied with the first power command Pref in accordance with change in Vdc. As in the case shown in FIG. 18, the values of Vdc are divided into five regions A to E, and the gain K1 is determined accordingly.

Normally, Vdc is within the center region C, and K is 1 in the region C. When Vdc changes and enters the region B or the region D, the gain K1 decreases as Vdc is separated from Vdcc, and then becomes zero.

As shown in FIG. 19, the first power command Pref is multiplied by the gain K1 in the multiplier 177 and then the correction amount Padd is added thereto in the adder 171, whereby the first power command Pref is corrected.

The primary-side voltage Vdc which is the detection value 33a on the primary side is inputted to the table 172, the flag generator 174, and the table 176. The first power command Pref is also inputted to the flag generator 174. The other configurations and operations are the same as those shown in FIG. 17.

In this case, if the primary-side voltage Vdc deviates from the normal region C and is separated from Vdcc, the gain K1 decreases, and thus, the first power command Pref received from the control unit 12 is less reflected in the corrected power command. Then, K1 eventually becomes zero, so that only an action of causing Vdc to approach Vdcc remains. In this way, the power control unit 157 operates with highest priority given on suppression of voltage change of Vdc when Vdc deviates from the region C.

The input-output characteristics of the table 176 are not limited to those shown in FIG. 20, but may be determined in accordance with the priority balance of the first power command Pref from the control unit 12 and voltage maintenance of the primary-side voltage Vdc. Instead of using the table 176, a calculation formula may be used.

The common DC buses 1 are connected to the DC distribution lines 21, and are connected to the primary side of the DC/DC converter 10 and the secondary side of the DC/AC converter 11. It can be said that the voltage of the common DC buses corresponds to voltage of the DC distribution lines 21, and the primary-side voltage of the DC/DC converter 10 and the secondary-side voltage of the DC/AC converter 11 correspond to voltage of the common DC buses 1. For maintaining the DC voltage Vdc of the common DC buses 1, it is possible to perform control not only using the DC/DC converter 10 as described above but also using the DC/AC converter 11.

Figure 21:
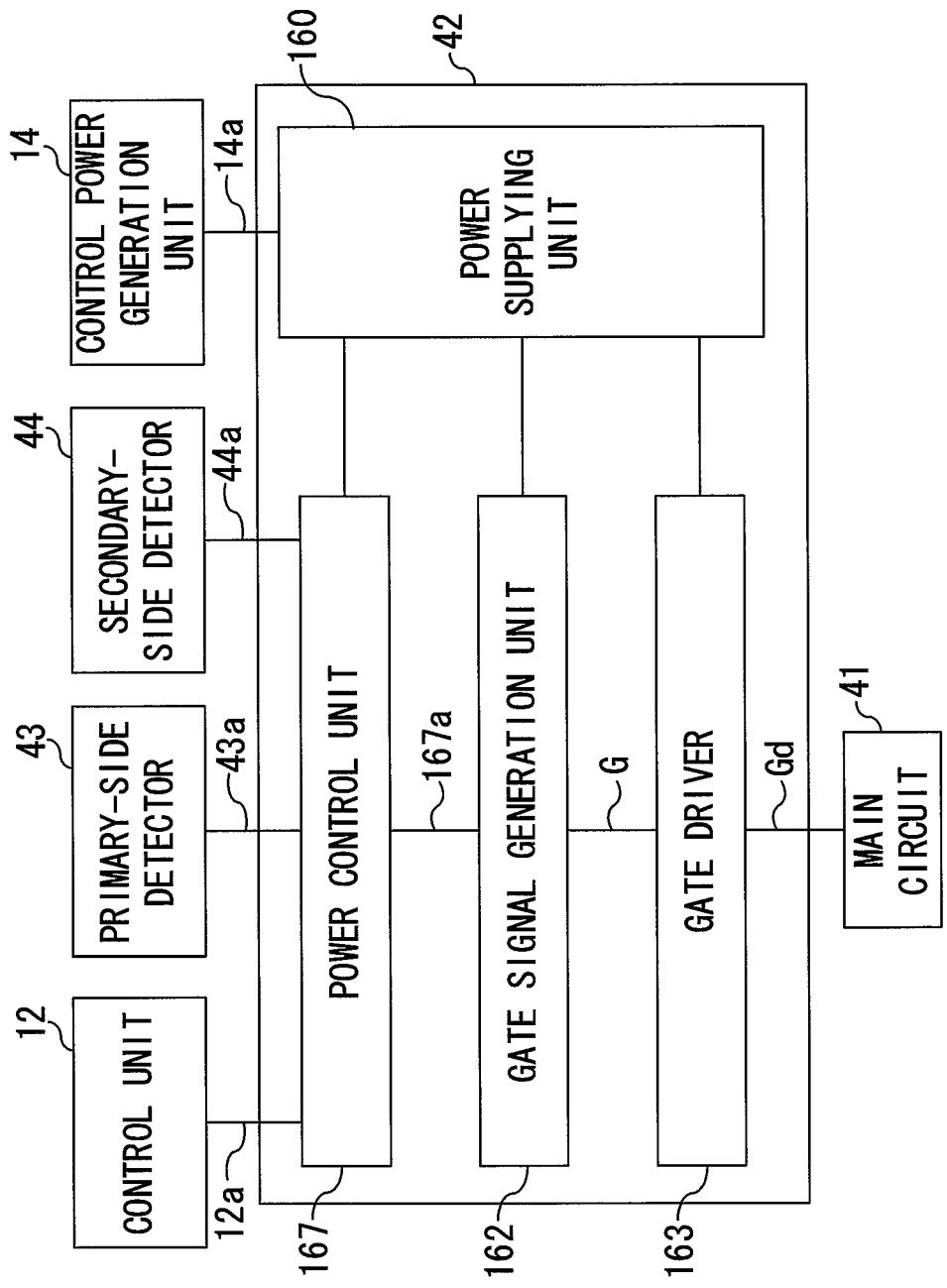
FIG. 21 is a configuration diagram of a control circuit of a DC/AC converter according to embodiment 2 of the present invention.

FIG. 21 is a diagram showing the configuration of the control circuit 42 of the DC/AC converter 11 according to embodiment 2 of the present invention. Parts different from embodiment 1 will be mainly described, while description of the same parts as in embodiment 1 is omitted as appropriate.

As shown in FIG. 21, the control circuit 42 includes the power supplying unit 160, a power control unit 167, the gate signal generation unit 162, and the gate driver 163. The power supplying unit 160, the gate signal generation unit 162, and the gate driver 163 are the same as those in the above embodiment 1, but the power control unit 167 is different.

As in the above embodiment 1, the second power command (power command value Pref) which is the power command 12a from the control unit 12, the detection value 43a from the detector 43 on the primary side, and the detection value 44a from the detector 44 on the secondary side, are given to the power control unit 167. A control output 167a from the power control unit 167 is inputted to the gate signal generation unit 162.

In this case, the second power command Pref corrected in accordance with change in secondary-side voltage Vdc which is the detection value 44a on the secondary side is used. That is, the output power of the DC/AC converter 11 is corrected.

Figure 22:
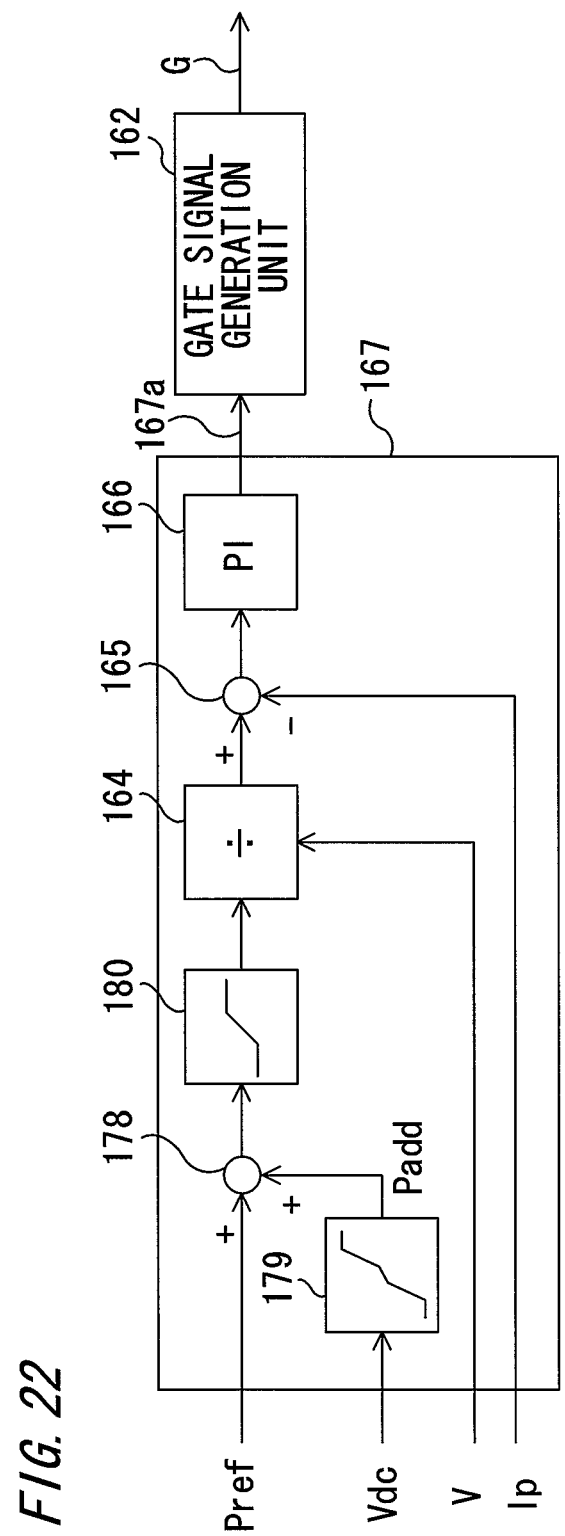
FIG. 22 is a configuration diagram of a power control unit in the control circuit of the DC/AC converter according to embodiment 2 of the present invention.

FIG. 22 is a block diagram showing the configuration of the power control unit 167. It is noted that FIG. 22 shows only a block corresponding to active power.

As shown in FIG. 22, the second power command Pref is corrected by an adder 178 adding a correction amount Padd thereto. The corrected second power command Pref is limited to a value not greater than the converter rated power of the DC/AC converter 11 by a limiter 180, and then is inputted to a divider 164. The secondary-side voltage Vdc which is the detection value 44a on the secondary side is inputted to a table 179.

Figure 23:
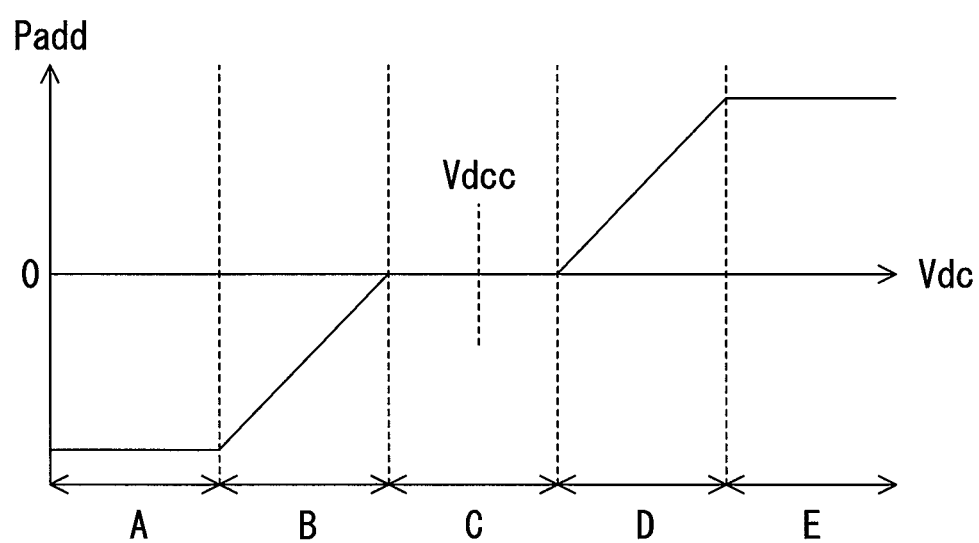
FIG. 23 illustrates correction of a power command of the DC/AC converter according to embodiment 2 of the present invention.

FIG. 23 shows the relationship between input and output of the table 179.

As shown in FIG. 23, the table 179 outputs the correction amount Padd for correcting the second power command Pref in accordance with change in Vdc. The values of Vdc are divided into five regions A to E, and the correction amount Padd is determined accordingly. Also in this case, Vdc is normally within the center region C, and the median value in the region C is Vdcc.

Normally, the DC/AC converter 11 does not control the secondary-side voltage Vdc, and therefore, when Vdc is in the region C, Padd is zero. When Vdc is separated from Vdcc and enters the region B or the region D, the absolute value of Padd increases as Vdc is separated from Vdcc. In the region D, Padd is set to be positive, so that power to be outputted in a direction from the common DC buses 1 to the AC buses 2 increases, or power to be outputted in a direction from the AC buses 2 to the common DC buses 1 decreases. In the region B, Padd is set to be negative, so that power to be outputted in a direction from the common DC buses 1 to the AC buses 2 decreases, or power to be outputted in a direction from the AC buses 2 to the common DC buses 1 increases.

Thus, power is interchanged between the common DC buses 1 and the AC distribution lines 22 so as to return Vdc into the region C.

When Vdc is further separated from Vdcc and enters the region A or the region E, the absolute value of Padd cannot be increased because of the converter rated capacity, and thus Padd becomes constant.

If Vdc exceeds the upper or lower limit of the operating range of the DC/AC converter 11, all the gate signals G are turned off so as to stop charging/discharging.

In FIG. 23, the characteristics are set to have symmetry with respect to Vdcc. However, the characteristics are not limited thereto. The slope may be different between the region B and the region D, or the region widths may be different from each other.

The correction amount Padd outputted from the table 179 is inputted to the adder 178.

Then, as described above, the adder 178 adds the correction amount Padd to the first power command Pref, and the resultant value is limited by the limiter 180 and inputted to the divider 164. Then, output of the limiter 180 is divided by the voltage detection value V in the divider 164. Output of the divider 164 corresponds to an active current command value and is inputted to a subtractor 165. The subtractor 165 outputs a deviation between the inputted active current command value and an inputted active current detection value Ip, and the deviation is inputted to a current controller (PI) 166. The current controller 166 is, for example, a proportional integral controller, and generates and outputs a control output 167a so that the inputted deviation becomes small.

The input-output characteristics of the table 179 are not limited to those shown in FIG. 23, but may be determined in accordance with the priority balance of the second power command Pref from the control unit 12 and voltage maintenance of the secondary-side voltage Vdc. Instead of using the table 179, a calculation formula may be used.

When Vdc enters a region lower than the instantaneous voltage value of the AC distribution lines 22, power is supplied from the AC power distribution grid 28 to the DC distribution lines 21 even if all the gate signals G are turned off. In this case, it is necessary to temporarily disconnect the DC/AC converter 11 from the AC power distribution grid 28 or the DC power distribution grid 27.

In the power control unit 167 described above, for example, if Vdc is reduced when the second power command Pref is positive and power is being supplied to the AC buses 2, the negative correction amount Padd is canceled by the positive second power command Pref and thus supply of power from the AC buses 2 to the common DC buses 1 is suppressed. That is, control is performed with low priority given on voltage maintenance of the secondary-side voltage Vdc.

Figure 24:
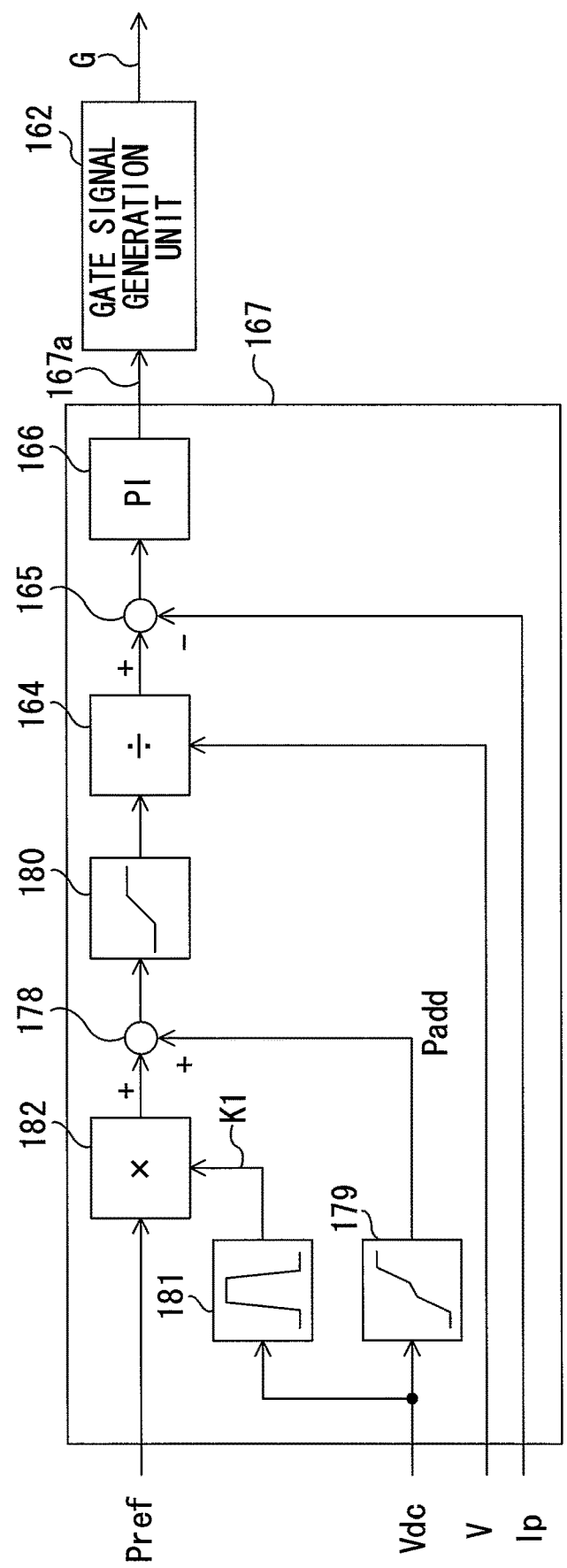
FIG. 24 is a configuration diagram of a power control unit in the control circuit of the DC/AC converter in another example according to embodiment 2 of the present invention.

The power control unit 167 may be configured as shown in FIG. 24, and in this control configuration, priority of voltage maintenance of the secondary-side voltage Vdc is high.

The power control unit 167 shown in FIG. 24 is obtained by adding a table 181 and a multiplier 182 to the power control unit 167 shown in FIG. 22.

As shown in FIG. 24, the secondary-side voltage Vdc is inputted to the table 179 and the table 181. The second power command Pref is multiplied by a gain K1 outputted from the table 179 in the multiplier 182 and then the correction amount Padd is added thereto in the adder 178, whereby the second power command Pref is corrected.

The input-output characteristics of the table 181 may be the same as those shown in FIG. 20, for example.

In this case, the power control unit 167 operates with highest priority given on suppression of voltage change of Vdc when Vdc deviates from the region C.

The input-output characteristics of the table 181 are not limited to those shown in FIG. 20, but may be determined in accordance with the priority balance of the second power command Pref from the control unit 12 and voltage maintenance of the secondary-side voltage Vdc. Instead of using the table 181, a calculation formula may be used.

The operation methods of the power conversion device 100 for maintaining the DC voltage Vdc, i.e., voltage of the DC power distribution grid 27, include a method of charging/discharging the DC distributed power supply 25 using the DC/DC converter 10, a method of interchanging power with the AC power distribution grid 28 using the DC/AC converter 11, and a method using the above two methods in combination.

The operation method may be fixed in advance in accordance with the installation place or the usage method, or may be changed in accordance with the circumstances. However, in the case of using the above two methods in combination, power transferred to/from the DC power distribution grid 27 needs to fall within the converter capacity.

For example, power is transferred to/from the AC power distribution grid 28 by an amount obtained by subtracting the total capacities of the DC/DC converters 10 that are connected to the DC distributed power supplies 25 capable of charging and discharging and can be used for voltage maintenance of Vdc, from the maximum value of power to be transferred to/from the DC power distribution grid 27. That is, the number of the DC/AC converters 11 for performing control for voltage maintenance of Vdc is limited or the limiter for the table 179 of the DC/AC converter 11 is limited. Such operation is performed through a command from the control unit 12 to each DC/AC converter 11.

Next, voltage change in the AC buses 2 will be described.

The AC buses 2 are connected to the AC distribution lines 22, and are connected to the primary side of the DC/AC converter 11. It can be said that the voltage of the AC buses 2 corresponds to the voltage of the AC distribution lines 22, and the primary-side voltage of the DC/AC converter 11 corresponds to the voltage of the AC buses 2. That is, the voltage of the AC buses 2 can be maintained using the DC/AC converter 11.

Also in this case, as in the power control unit 167 shown in FIG. 22 or FIG. 24, the second power command (active power command value Pref) to which the correction amount Padd has been added is used. In this case, instead of Vdc, an effective value Vac of the primary-side voltage (voltage of AC buses 2) of the DC/AC converter 11 is used. In addition, instead of the table 179, a table having input-output characteristics shown in, for example, FIG. 25, is used to calculate the correction amount Padd.

Figure 25:
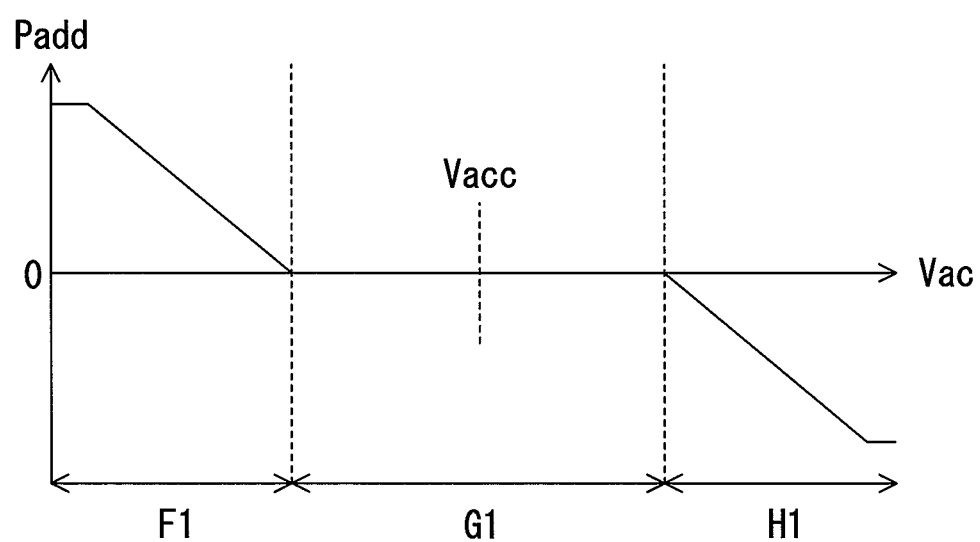
FIG. 25 illustrates correction of a power command of the DC/AC converter in another example according to embodiment 2 of the present invention.

As shown in FIG. 25, the table outputs the correction amount Padd for correcting the second power command Pref in accordance with change in Vac. The values of Vac are divided into three regions F1, G1, H1 in the increasing order of Vac, and the correction amount Padd is determined accordingly. In this case, Vac is normally within the center region G1, and the median value (reference value) in the region G1 is Vacc.

When Vac is in the region G1, Padd is zero. When Vac is separated from Vacc and enters the region F1 or the region H1, the absolute value of Padd increases as Vac is separated from Vacc. In the region F1, Padd is set to be positive, so that power to be outputted in a direction from the common DC buses 1 to the AC buses 2 increases, or power to be outputted in a direction from the AC buses 2 to the common DC buses 1 decreases. In the region H1, Padd is set to be negative, so that power to be outputted in a direction from the common DC buses 1 to the AC buses 2 decreases, or power to be outputted in a direction from the AC buses 2 to the common DC buses 1 increases.

In the case where the AC power distribution grid 28 has characteristics of changing the frequency in accordance with power balance, the correction amount Padd may be calculated in accordance with the frequency fac of the primary-side voltage of the DC/AC converter 11. In this case, the correction amount Padd is calculated using a table having the input-output characteristics shown in FIG. 26, for example.

Figure 26:
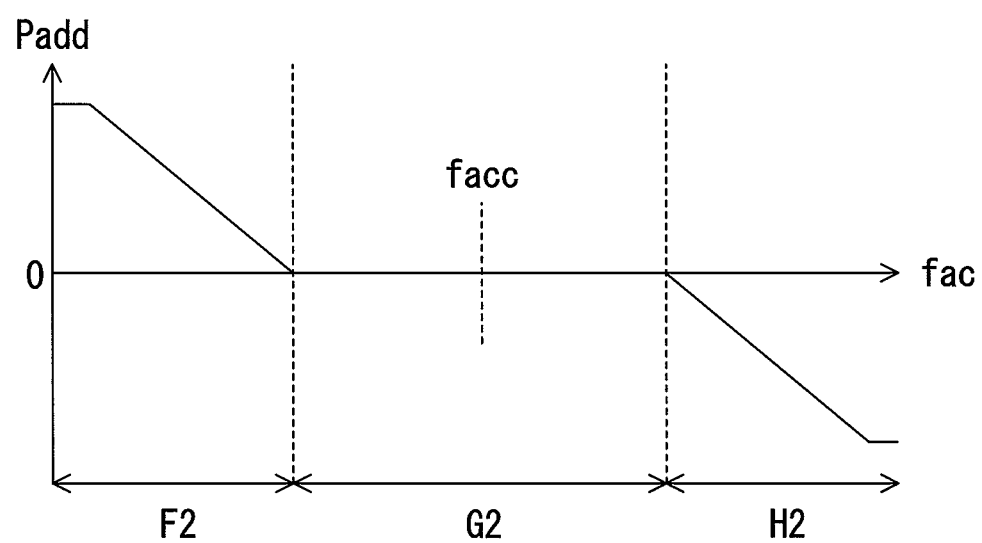
FIG. 26 illustrates correction of a power command of the DC/AC converter in another example according to embodiment 2 of the present invention.

As shown in FIG. 26, the table outputs the correction amount Padd for correcting the second power command Pref in accordance with change in fac. The values of fac are divided into three regions F2, G2, H2 in the increasing order of fac, and the correction amount Padd is determined accordingly. In this case, fac is normally within the center region G2, and the median value (reference value) in the region G2 is facc.

When fac is in the region G2, Padd is zero. When fac is separated from facc and enters the region F2 or the region H2, the absolute value of Padd increases as fac is separated from facc. In the region F2, Padd is set to be positive, so that power to be outputted in a direction from the common DC buses 1 to the AC buses 2 increases, or power to be outputted in a direction from the AC buses 2 to the common DC buses 1 decreases. In the region H2, Padd is set to be negative, so that power to be outputted in a direction from the common DC buses 1 to the AC buses 2 decreases, or power to be outputted in a direction from the AC buses 2 to the common DC buses 1 increases.

Operation of the power conversion device 100 for maintaining the AC voltage Vac, i.e., voltage of the AC power distribution grid 28, is performed through power interchange between the common DC buses 1 and the AC power distribution grid 28 using the DC/AC converter 11. Methods for supplying power to the common DC buses 1 or receiving power from the common DC buses 1 include a method of charging/discharging the DC distributed power supply 25 using the DC/DC converter 10, a method of interchanging power with the DC power distribution grid 27 via the common DC buses 1, and a method using the above two methods in combination.

There is no converter between the common DC buses 1 and the DC distribution lines 21, and therefore, when power balance is to be lost in the common DC buses 1, power for deficiency is automatically supplied from the DC distribution lines 21 or surplus power is automatically supplied to the DC distribution lines 21.

When the voltage Vdc changes by the DC/AC converter 11 performing operation for maintaining the voltage Vac, the DC/DC converter 10 performs the following operation accordingly. That is, the DC/DC converter 10 to which the DC distributed power supply 25 is connected operates in a direction for maintaining Vdc by the action of the power control unit 157. As a result, power is interchanged with the AC distribution lines 22.

In the power control unit 157 shown in FIG. 17 or FIG. 19, which is used for control of the DC/DC converter 10, Vac or fac may be input instead of Vdc, and the correction amount Padd may be calculated in accordance with Vac or fac. In this case, the correction amount Padd is determined using a table having the input-output characteristics as shown in FIG. 25 or FIG. 26. When Vac or fac decreases, Padd becomes positive, so that discharge power from the DC distributed power supply 25 increases or charge power thereto decreases. When Vac or fac increases, Padd becomes negative, so that charge power to the DC distributed power supply 25 increases or discharge power therefrom decreases.

In this way, it is possible to interchange power between the DC distributed power supply 25 and the AC distribution lines 22 even when Vdc does not change.

The table having the input-output characteristics shown in FIG. 25 or FIG. 26 may be provided to the control unit 12, and the control unit 12 may generate the correction amount Padd. In this case, the control unit 12 may add the correction amount Padd to each power command Pref which is the high-order control command 24a given from the high-order control device 24, and may transmit the corrected power command to the power control unit 157.

Thus, control for maintaining the DC voltage Vdc and control for maintaining the AC voltage Vac using the power conversion device 100 have been described. In general, Vdc is maintained in the case of AC power reception (see FIG. 14), and Vac is maintained in the case of DC power reception (see FIG. 15). Maintenance of only Vdc, maintenance of only Vac, or maintenance of both Vdc and Vac can be selected in accordance with the installation method and the usage method. In the case of maintaining both Vdc and Vac, blocks for calculating the correction amount Padd for the power command Pref are provided for both Vdc and Vac. In this case, a priority order is set to avoid interference.

In the power conversion device 100 according to the present embodiment 2, the control circuit 32 of the DC/DC converter 10 includes the power control unit 157 having the block for calculating the correction amount Padd for the first power command, and the control circuit 42 of the DC/AC converter 11 includes the power control unit 167 having the block for calculating the correction amount Padd for the second power command (active power command value).

Thus, in addition to the effects in the above embodiment 1, the power conversion device 100 operates as follows irrespective of the command from the high-order control device 24. When the voltage Vdc of the common DC buses 1 is separated from the reference value and decreases, the discharging amount of the DC distributed power supply 25 is increased or the charging amount thereof is decreased, or power is interchanged with the AC power distribution grid 28. When the voltage Vdc of the common DC buses 1 increases from the reference value, the charging amount of the DC distributed power supply 25 is increased or the discharging amount thereof is decreased, or power is interchanged with the AC power distribution grid 28. Thus, the power conversion device 100 can automatically operate so as to cause the voltage of the common DC buses 1, i.e., the voltage of the DC distribution lines 21 to approach a desirable range.

Further, the power conversion device 100 operates as follows irrespective of the command from the high-order control device 24. When the voltage Vac of the AC buses 2 is separated from the reference value and decreases or the frequency fac decreases, power to be supplied from the common DC buses 1 to the AC distribution lines 22 is increased or power to be supplied from the AC distribution lines 22 is decreased. When the voltage Vac increases from the reference value or the frequency fac increases, power to be supplied from the AC distribution lines 22 is increased or power to be supplied to the AC distribution lines 22 is decreased. Thus, the power conversion device 100 can automatically operate so as to cause the voltage of the AC buses 2, i.e., the AC distribution lines 22 to approach a desirable range through power interchange with both or one of the DC distributed power supply 25 and the DC distribution lines 21.

As described above, the power conversion device 100 operates so as to automatically suppress voltage change in the DC voltage Vdc and/or the AC voltage Vac. Therefore, it is possible to perform power conversion operation with high reliability and high accuracy, in particular, even in the case of being connected to a power distribution grid in which voltage readily changes due to load variation.

In addition, the voltages Vdc, Vac to be maintained and power to be interchanged can be set as appropriate in accordance with the installation manner and the usage method of the power conversion device 100.

Embodiment 3

Next, a power conversion device according to embodiment 3 of the present invention will be described.

In the above embodiment 1, the first power command for the DC/DC converter 10 and the second power command for the DC/AC converter 11 are received as the high-order control commands 24a from the high-order control device 24 by the control unit 12 and used. On the other hand, in the present embodiment 3, the control unit 12 generates the first power command and the second power command. The configurations other than the control unit 12 are the same as in the above embodiment 1.

Figure 27:
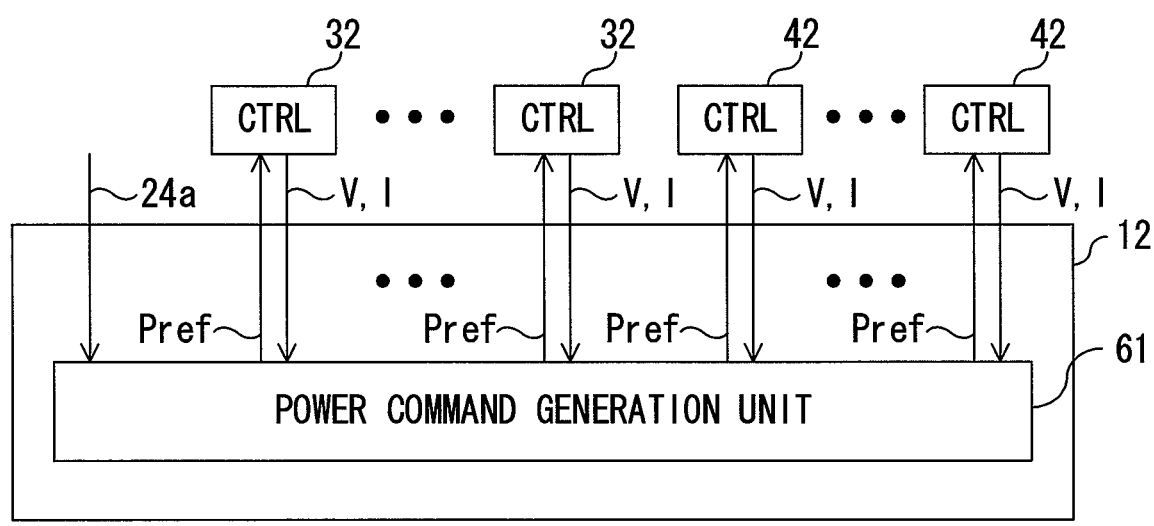
FIG. 27 illustrates a control unit of a power conversion device according to embodiment 3 of the present invention.

FIG. 27 is a diagram showing the control unit 12 according to the present embodiment 3. In this case, the control unit 12 collectively receives power command values for power to be inputted/outputted to/from the power conversion device 100, as the high-order control commands 24a from the high-order control device 24.

As shown in FIG. 27, the control unit 12 includes a power command generation unit 61. The power command generation unit 61 receives the power command values which are the high-order control commands 24a, voltage/current information which is the detection values 33a, 34a from the control circuits 32 of the DC/DC converters 10, and voltage/current information which is the detection values 43a, 44a from the control circuits 42 of the DC/AC converters 11. The power command generation unit 61 generates the first power command Pref for each DC/DC converter 10 and the second power command Pref for each DC/AC converter 11 on the basis of the above received information, and outputs the generated commands to the control circuits 32 of the DC/DC converters 10 and the control circuits 42 of the DC/AC converters 11.

In the present embodiment 3, the high-order control device 24 gives the power command values (high-order control commands 24a) for power to be inputted/outputted to/from the power conversion device 100, to the control unit 12, and the control unit 12 generates the first power commands and the second power commands and transmits these commands to the control circuits 32 of the DC/DC converters 10 and the control circuits 42 of the DC/AC converters 11.

The method for determining the first power command for each DC/DC converter 10 and the second power command for each DC/AC converter 11 will be described below.

In this case, the high-order control device 24 specifies, as the high-order control commands 24a, a total power command PA for charge/discharge powers of the DC distributed power supplies 25, 26 connected to the power conversion devices 100, a power command PB for power to be transferred between the power conversion device 100 and the DC power distribution grid 27, and a power command PC for power to be transferred between the power conversion device 100 and the AC power distribution grid 28. Individual charge/discharge power for each DC distributed power supply 25, 26 is not specified.

The total power command PA is a command for the sum of input/output powers of the N pairs of distributed power supply connection terminals 13, the power command PB is an input/output power command for the DC connection terminals 3, and the power command PC is an input/output power command for the AC connection terminals 4.

The power command generation unit 61 determines the first power command Pref for each DC/DC converter 10 so as to reduce loss, in accordance with the total power command PA for charge/discharge powers of the DC distributed power supplies 25, 26, and the converter efficiency. In addition, the power command generation unit 61 determines the second power command Pref for each DC/AC converter 11 so as to reduce loss, in accordance with the power command PC for power to be transferred between the power conversion device 100 and the AC power distribution grid 28, and the converter efficiency. In this case, the power command PB is not directly used for generation of the first and second power commands Pref but is used in an auxiliary manner for adjustment or the like.

In general, the converter efficiency of the DC/DC converters 10 and the DC/AC converters 11 is low in a case of low load. Therefore, in the case where used power is small, it is effective to operate some of the converters without equally allocating operations. The converters to be operated may be changed as appropriate without being fixed. The converter having high temperature may be stopped on the basis of temperature information about the converters.

On the basis of specification information about the connected DC distributed power supplies 25, 26, the DC/DC converter 10 to which the DC distributed power supply 26 that performs only electric generation is connected may be preferentially used for discharging. In this case, the first power command Pref for the DC/DC converter 10 to which the DC distributed power supply 26 is connected is set to a value corresponding to the maximum generated power of the DC distributed power supply 26. Then, the first power command Pref for the DC/DC converter 10 to which the DC distributed power supply 25 is connected is adjusted so as to match the power specified by the high-order control device 24.

The first power commands Pref may be determined in consideration of the charge states or the temperatures of the DC distributed power supplies 25. For example, in the case of charging, the DC/DC converter 10 to which the DC distributed power supply 25 in a low charge state is connected may be preferentially operated. In addition, charging/discharging which shortens the life of the DC distributed power supply 25 may be suppressed.

The control unit 12 can receive various information about the DC distributed power supplies 25, 26 from the high-order control device 24 or the control circuits 32 of the DC/DC converters 10, and the information is inputted to the power command generation unit 61 so as to be used.

Figure 28:
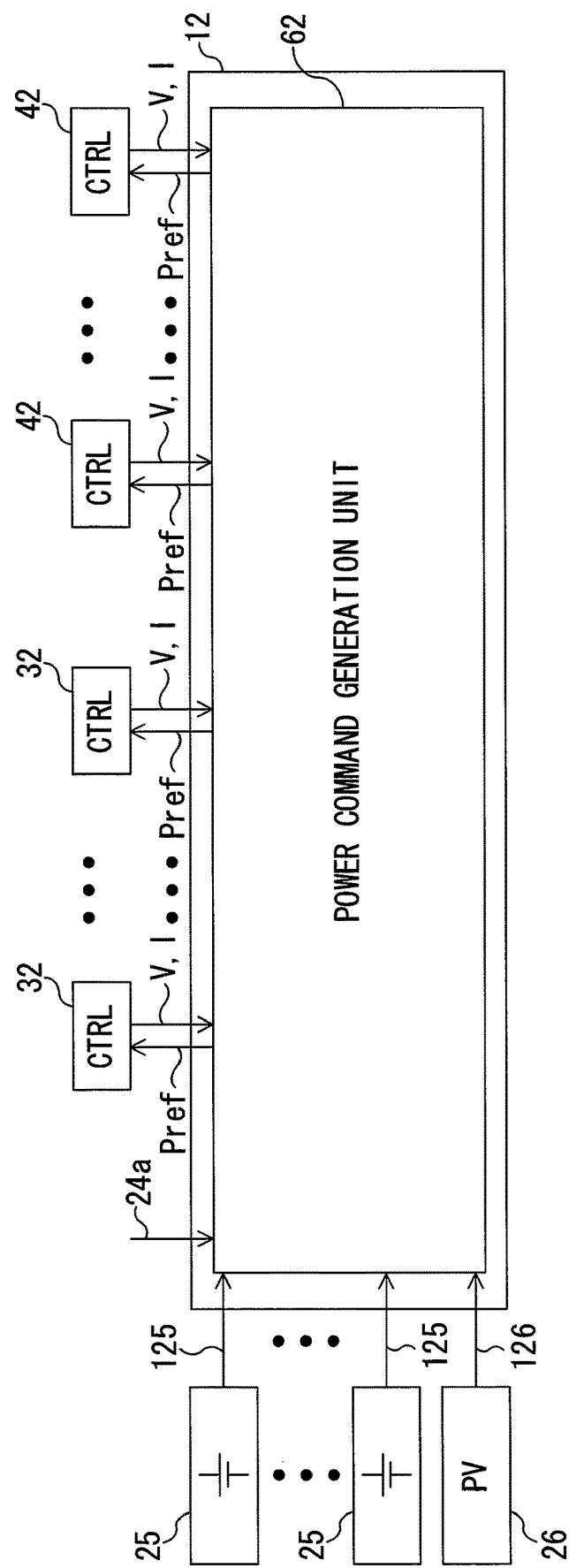
FIG. 28 illustrates a control unit of the power conversion device in another example according to embodiment 3 of the present invention.

FIG. 28 is a diagram showing the control unit 12 in another example.

As shown in FIG. 28, the control unit 12 includes a power command generation unit 62. In this case, the power command generation unit 62 receives various detection values and specification information which are information 125, 126 about the DC distributed power supplies 25, 26, directly from the DC distributed power supplies 25, 26. Therefore, it is possible to receive and use the information 125, 126 about the DC distributed power supplies 25, 26 not via the high-order control device 24 or the control circuits 32 of the DC/DC converters 10. The other configurations are the same as in the control unit 12 shown in FIG. 27.

As described above, in the present embodiment 3, the control unit 12 includes the power command generation unit 61, 62 to determine power allocations for the DC/DC converters 10 and the DC/AC converters 11 and determine the first power commands Pref and the second power commands Pref.

Thus, in addition to the effects in the above embodiment 1, the information amount of the high-order control commands 24a received from the high-order control device 24 can be reduced. In addition, the calculation amount in the high-order control device 24 can be reduced.

In addition, the control unit 12 can determine the first and second power commands Pref so as to reduce loss generated in the power conversion device 100, and can determine the first and second power commands Pref so as not to concentrate burdens on some of the DC/DC converters 10 and the DC/AC converters 11. Thus, power can be effectively used.

Further, the control unit 12 can determine the first and second power commands Pref in consideration of the types and the charge states of the DC distributed power supplies 25, 26, thereby providing effects that generated power can be effectively used, deterioration of storage batteries can be suppressed, and power interchange can be performed with use of small storage battery capacities.

The above embodiment 2 may be applied to the above embodiment 3 so that the first power command and the second power command can be corrected. Thus, the effects in the above embodiment 2 are also obtained together.

Embodiment 4

Next, a power conversion device according to embodiment 4 of the present invention will be described.

The present embodiment 4 is different in the configuration of the main circuit unit of the DC/DC converter 10 in the power conversion device 100. In addition, the configuration of the control circuit 32 is partially changed in accordance with the configuration of the main circuit unit. The other configurations are the same as in embodiment 1.

Figure 29:
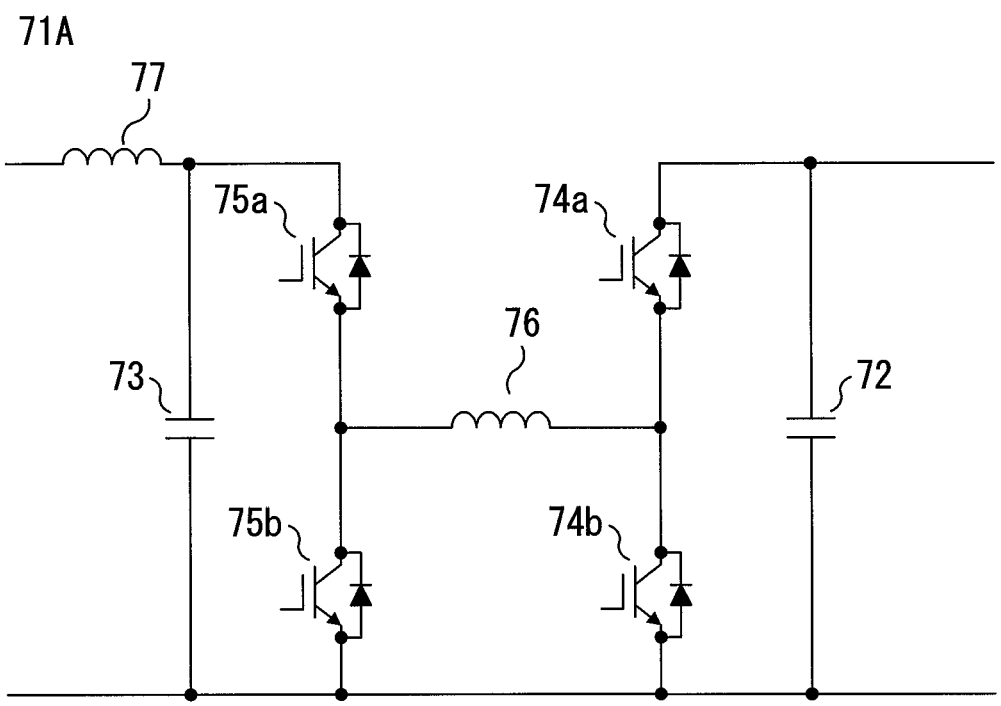
FIG. 29 is a configuration diagram of a main circuit unit of a DC/DC converter according to embodiment 4 of the present invention.

FIG. 29 is a diagram showing a main circuit unit 71A of the DC/DC converter 10 according to the present embodiment 4. As shown in FIG. 29, the main circuit unit 71A includes a primary-side smoothing capacitor 72, a secondary-side smoothing capacitor 73, primary-side semiconductor switching elements 74a, 74b, secondary-side semiconductor switching elements 75a, 75b, a reactor 76, and a filter reactor 77.

The semiconductor switching elements 74a, 74b, 75a, 75b are formed from IGBTs to which diodes are connected in antiparallel. The semiconductor switching elements 74a, 74b, 75a, 75b may be other semiconductor elements such as MOSFETs.

In this case, the primary side and the secondary side are not isolated from each other, and bidirectional power conversion can be performed irrespective of the magnitude relationship between the primary-side voltage and the secondary-side voltage.

Figure 30:
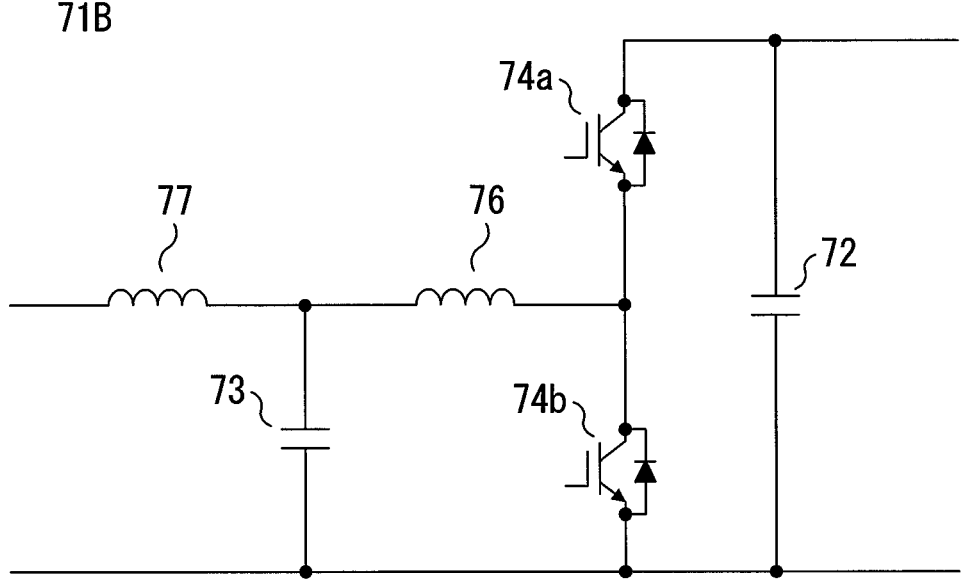
FIG. 30 is a configuration diagram of a main circuit unit of the DC/DC converter in another example according to embodiment 4 of the present invention.

FIG. 30 is a diagram showing a main circuit unit 71B of the DC/DC converter 10 in another example according to the present embodiment 4. As shown in FIG. 30, the main circuit unit 71B includes a primary-side smoothing capacitor 72, a secondary-side smoothing capacitor 73, and primary-side semiconductor switching elements 74a, 74b, a reactor 76, and a filter reactor 77.

In this case, the primary side and the secondary side are not isolated from each other, and bidirectional power conversion can be performed when the primary-side voltage is higher than the secondary-side voltage.

Figure 31:
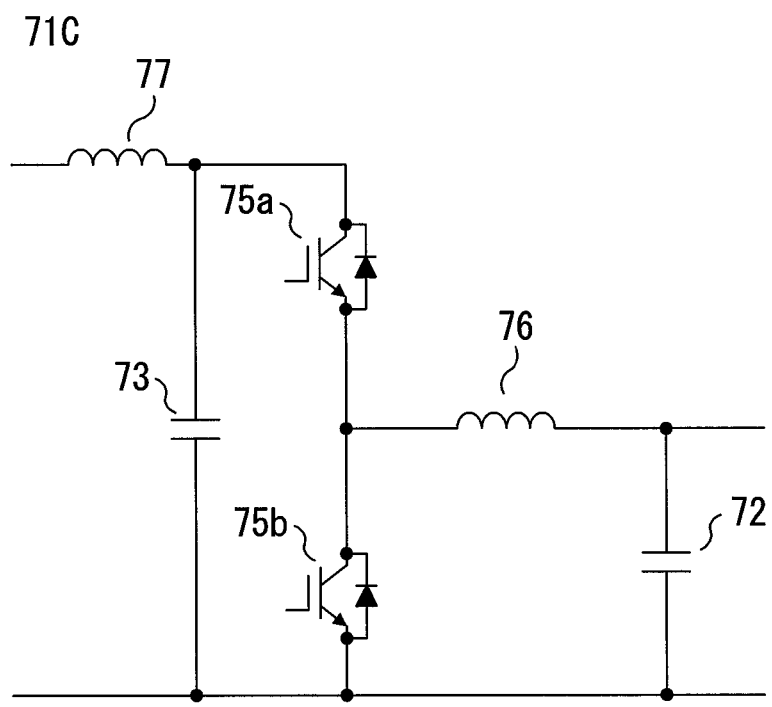
FIG. 31 is a configuration diagram of a main circuit unit of the DC/DC converter in another example according to embodiment 4 of the present invention.

FIG. 31 is a diagram showing a main circuit unit 71C of the DC/DC converter 10 in still another example according to the present embodiment 4. As shown in FIG. 31, the main circuit unit 71C includes a primary-side smoothing capacitor 72, a secondary-side smoothing capacitor 73, secondary-side semiconductor switching elements 75a, 75b, a reactor 76, and a filter reactor 77.

In this case, the primary side and the secondary side are not isolated from each other, and bidirectional power conversion can be performed when the secondary-side voltage is higher than the primary-side voltage.

In the present embodiment, any of the main circuit units 71A, 71B, 71C shown in FIG. 29 to FIG. 31 is used instead of the main circuit unit 31 of the DC/DC converter 10 shown in the above embodiment 1. All the main circuit units 31 may be replaced, or some of them may be replaced.

The main circuit unit of the DC/DC converter 10 is not limited to the ones shown in the above description, but another circuit type may be applied.

As described above, various circuit configurations can be applied to the main circuit unit of the DC/DC converter 10. Therefore, it is possible to select the main circuit unit in accordance with the configuration of the DC distributed power supply 25, 26 connected to the secondary side of each DC/DC converter 10, in consideration of the type, the operation specifications, unit cost, and the like thereof. Thus, while the effects in the above embodiment 1 are obtained, the characteristics of the DC distributed power supplies can be effectively utilized and the unit cost can be reduced.

Also in the present embodiment, one or both of the above embodiments 2, 3 can be applied, whereby the effects in each of the embodiments 2, 3 can be obtained.

Embodiment 5

Next, a power conversion device according to embodiment 5 of the present invention will be described.

In the above embodiment 1, the power conversion device 100 is configured as one block having the DC connection terminals 3, the AC connection terminals 4, and the N pairs of distributed power supply connection terminals 13, which serve as connection terminals to outside. On the other hand, in the present embodiment, a plurality of blocks are used.

Figure 32:
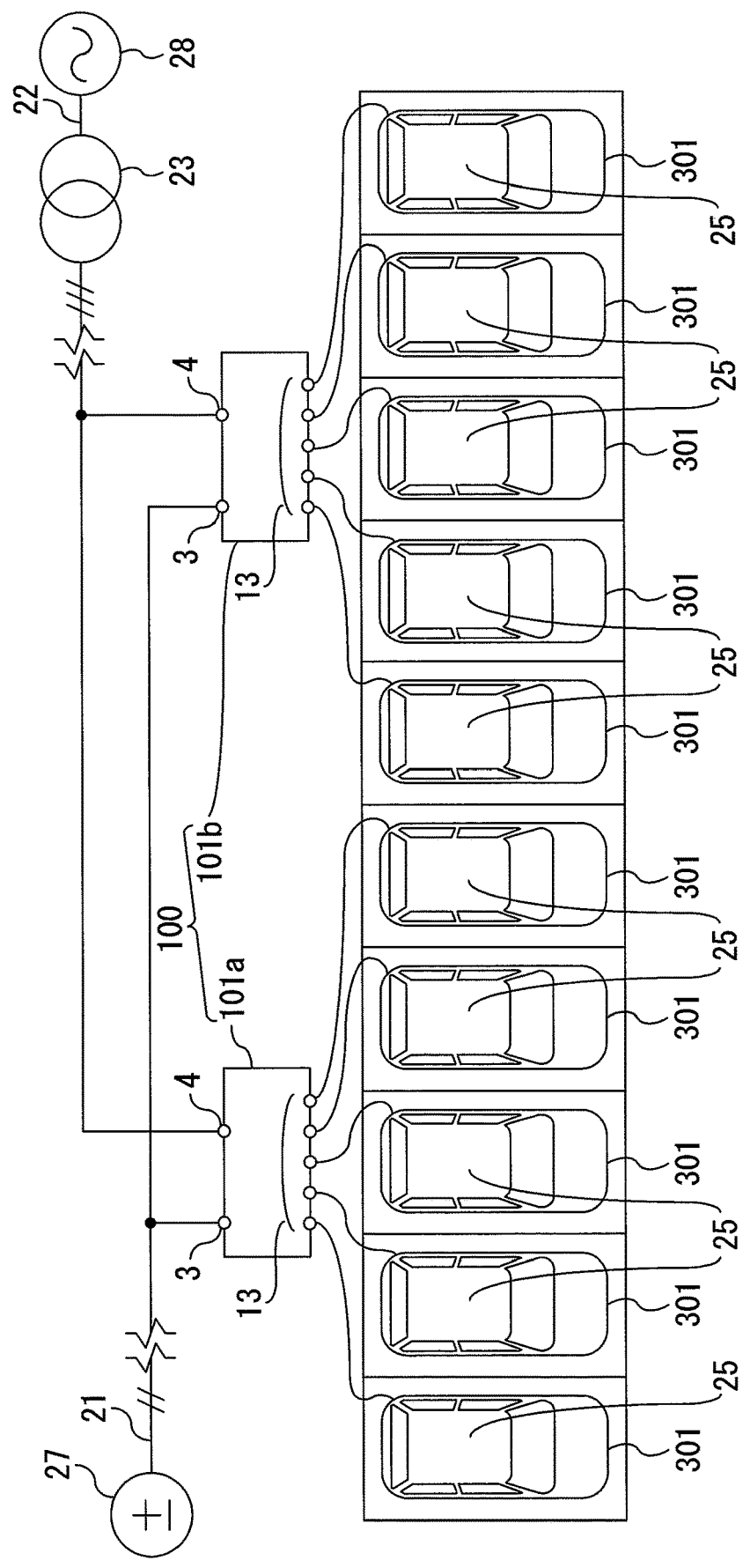
FIG. 32 is a configuration diagram of a power conversion device and a power distribution system according to embodiment 5 of the present invention.

FIG. 32 is a diagram showing the configuration of a power conversion device 100 according to the present embodiment 5, and a power distribution system to which the power conversion device 100 is applied.

As shown in FIG. 32, the power conversion device 100 includes two power conversion units 101a, 101b as blocks independent of each other. The two power conversion units 101a, 101b receive high-order control commands 24a from the common high-order control device 24.

Each power conversion unit 101a, 101b has the configuration and the function of the power conversion device 100 described in embodiment 1.

The DC connection terminals 3 of the power conversion unit 101a and the DC connection terminals 3 of the power conversion unit 101b are connected in parallel, and the AC connection terminals 4 of the power conversion unit 101a and the AC connection terminals of the power conversion unit 101b are connected in parallel. The DC connection terminals 3 are connected to the DC power distribution grid 27 via the DC distribution lines 21, and the AC connection terminals 4 are connected to the AC power distribution grid 28 via the transformer 23 and the AC distribution lines 22. A plurality of distributed power supply connection terminals 13 of each power conversion unit 101a, 101b are connected to DC distributed power supplies 25 capable of charging and discharging. In this case, an EV storage battery mounted on each electric vehicle 301 is the DC distributed power supply 25.

In the drawing, a set of positive and negative DC connection terminals 3, a set of three-phase AC connection terminals 4, and a set of positive and negative distributed power supply connection terminals 13 are each shown as one terminal, for simplification.

In the present embodiment, the DC distributed power supplies 25 which are the EV storage batteries of ten electric vehicles 301 parked at a parking lot are connected five by five to the power conversion units 101a, 101b.

In this case, each power conversion unit 101a, 101b has five pairs of distributed power supply connection terminals 13 to all of which the DC distributed power supplies 25 are connected. However, without limitation to this case, some of the distributed power supply connection terminals 13 may be in unused states.

Each electric vehicle 301 only has to be the one having a storage battery, such as a hybrid vehicle.

Further, a relay board may be provided between the distributed power supply connection terminals 13 and each electric vehicle 301, to indicate a charge/discharge state of the DC distributed power supply 25, or an operation panel for performing an input for starting/finishing charging from outside may be provided.

Figure 33:
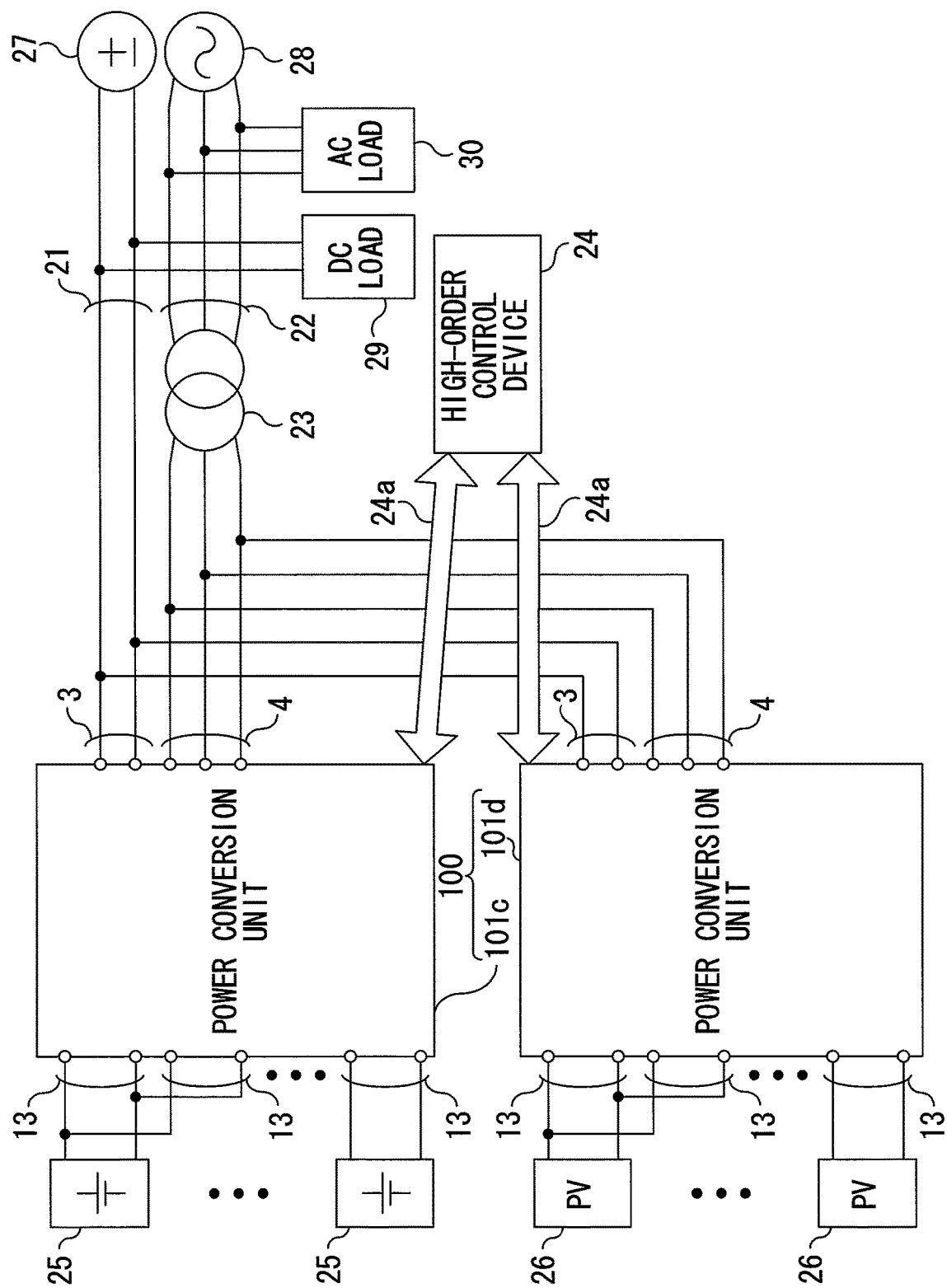
FIG. 33 is a configuration diagram of a power conversion device and a power distribution system in another example according to embodiment 5 of the present invention.
Figure 34:
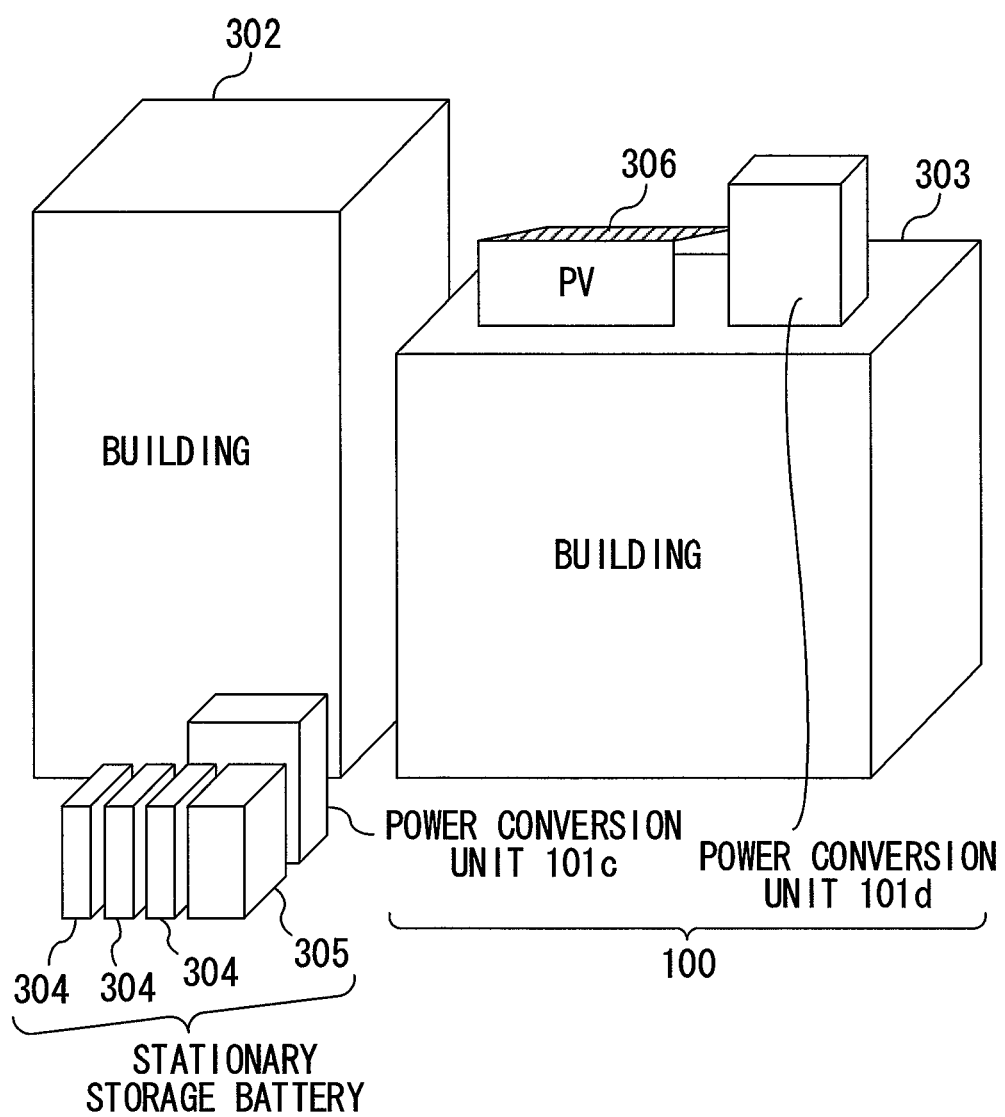
FIG. 34 is an arrangement diagram of the power conversion device and the power distribution system in another example according to embodiment 5 of the present invention.

FIG. 33 is a diagram showing the configuration of a power conversion device 100 in another example according to the present embodiment 5 and a power distribution system to which the power conversion device 100 is applied. FIG. 34 is an arrangement diagram for realizing the power conversion device 100 and the power distribution system shown in FIG. 33.

As shown in FIG. 33, the power conversion device 100 includes two power conversion units 101c, 101d as blocks independent of each other. The two power conversion units 101c, 101d receive high-order control commands 24a from the common high-order control device 24.

Each power conversion unit 101c, 101d has the configuration and the function of the power conversion device 100 described in embodiment 1.

The DC connection terminals 3 of the power conversion unit 101c and the DC connection terminals 3 of the power conversion unit 101d are connected in parallel, and the AC connection terminals 4 of the power conversion unit 101c and the AC connection terminals of the power conversion unit 101d are connected in parallel. The DC connection terminals 3 are connected to the DC power distribution grid 27 via the DC distribution lines 21, and the AC connection terminals 4 are connected to the AC power distribution grid 28 via the transformer 23 and the AC distribution lines 22.

A plurality of distributed power supply connection terminals 13 of the power conversion unit 101c are connected to the DC distributed power supplies 25 capable of charging and discharging. A plurality of distributed power supply connection terminals 13 of the power conversion unit 101*d* are connected to the DC distributed power supplies 26 each of which performs only electric generation.

Some of the distributed power supply connection terminals 13 are connected in parallel and then connected to the DC distributed power supply 25 or the DC distributed power supply 26.

As shown in FIG. 34, the power conversion unit 101*c* is placed adjacently to one building 302 of two buildings 302, 303, and stationary storage batteries 304, 305 are placed as the DC distributed power supplies 25. The stationary storage battery 305 is capable of charging and discharging with power twice as great as the stationary storage batteries 304. In this case, a plurality of distributed power supply connection terminals 13 connected in parallel are connected to the stationary storage battery 305. The stationary storage batteries 304, 305 are connected to the power conversion unit 101*c* and are charged/discharged.

The power conversion unit 101*d* and photovoltaic generation panels (PV) 306 are placed on the rooftop of the other building 303. The photovoltaic generation panels 306 divided as appropriate each correspond to one DC distributed power supply 26, and supply generated power to the DC distribution lines 21 and the AC distribution lines 22 via the power conversion unit 101*d*.

Each power conversion unit 101*c*, 101*d* can independently communicate with the high-order control device 24.

The following configuration may be adopted: the power conversion unit 101*c* is set as a master and the power conversion unit 101*d* is set as a slave, charge/discharge operation commands and the like are transmitted from the master to the slave, and state information and the like are transmitted from each individual unit to the high-order control device 24.

In the above embodiment 5, two power conversion units 101*c*, 101*d* that receive the common high-order control commands 24*a* are used. However, three or more power conversion units may be used.

The configurations of the DC distributed power supplies 25, 26 to be connected are not limited to the above ones. For example, an electric vehicle 301, a stationary storage battery 304, and a photovoltaic generation panel 306 may be connected in a mixed manner to one power conversion unit 101*c* (101*d*). In addition, the number of the distributed power supply connection terminals 13 connected in parallel may be determined in accordance with the capacity of the DC distributed power supply 25, 26 to be connected thereto, or some distributed power supply connection terminals 13 may be in unconnected states.

As described above, in the present embodiment, the power conversion device 100 can be configured using a plurality of power conversion units 101*a* to 101*d*. Therefore, the power conversion units 101*a* to 101*d* can be arranged in a dispersed manner, and by connecting multiple DC distributed power supplies 25, 26, the DC distributed power supplies 25, 26 each of which has a small capacity are integrated to have a middle capacity or a large capacity, and thus can be operated as VPP.

Thus, the power conversion device 100 according to the present embodiment provides the same effects as in the above embodiment 1, and can be easily applied and effectively used for the case of using multiple DC distributed power supplies 25, 26 and the case where a plurality of DC distributed power supplies 25, 26 are arranged in a dispersed manner.

In addition, power interchange can be performed, for example, in an office or between a plurality of buildings, whereby DC distributed power supplies of consumers can be effectively utilized. This is also effective for saving the amount of received power.

In addition, since each power conversion unit 101*a* to 101*d* has a function of communicating with the high-order control device 24, it is not necessary to provide another control device for overall control.

Further, by connecting the distributed power supply connection terminals 13 in parallel, it is possible to adapt to the case where charge/discharge power of the DC distributed power supply 25, 26 is great. Therefore, even if the number of the DC distributed power supplies 25, 26 increases, it is not necessary to increase the number of converter units and prepare a power conversion device having a large-sized one-block configuration.

In addition, even if the plurality of DC distributed power supplies 25, 26 have various different capacities, it is not necessary to prepare DC/DC converters 10 having different capacities.

Without limitation to the configuration in which the AC connection terminals 4 are connected in parallel and then connected to the transformer 23, the AC connection terminals 4 may be connected to the transformer 23 and then connected in parallel on the AC distribution line 22 side.

Without limitation to the configuration in which the power conversion units 101*a* to 101*d* receive the high-order control commands 24*a* directly from the common high-order control device 24, the power conversion units 101*a* to 101*d* may receive the high-order control commands 24*a* from a plurality of control devices for relay.

Also in the present embodiment, one of the above embodiments 2 to 4 or a combination of some of the above embodiments 2 to 4 can be applied, whereby the effects in each embodiment 2 to 4 can be obtained.

In the above embodiments, the number N of the DC/DC converters 10 is plural. However, N may be one, that is, only one DC/DC converter 10 may be provided. In this case, the DC distributed power supply 25 capable of charging/discharging is connected to the one DC/DC converter 10.

It is noted that, within the scope of the present invention, the above embodiments may be freely combined with each other, or each of the above embodiments may be modified or simplified as appropriate.

DESCRIPTION OF THE REFERENCE CHARACTERS 1 common DC bus
2 AC bus
3 DC connection terminal
4 AC connection terminal
10 DC/DC converter
11 DC/AC converter
12 control unit
13 distributed power supply connection terminal
21 DC power distribution grid
22 AC power distribution grid
24*a* high-order control command
25, 26 DC distributed power supply
32 control circuit
42 control circuit
100 power conversion device
101*a* to 101*d* power conversion unit

What is claimed is:

1. A power conversion device comprising:
N DC/DC converters;
M DC/AC converters;
a control unit configured to control the DC/DC converters and the DC/AC converters on the basis of a high-order control command;
common DC buses;
AC buses; and
DC connection terminals, AC connection terminals, and N pairs of positive and negative distributed power supply connection terminals, which serve as connection terminals to outside, wherein
the DC connection terminals are connected to the common DC buses and connected to an external DC power distribution grid,
the AC connection terminals are connected to the AC buses and connected to an external AC power distribution grid,
the N pairs of distributed power supply connection terminals are respectively connected to the N DC/DC converters and connected to external DC distributed power supplies,
the N DC/DC converters have primary sides directly connected to the common DC buses and secondary sides directly connected to the N pairs of distributed power supply connection terminals,
each DC/DC converter performs power conversion between the common DC buses and the corresponding distributed power supply connection terminals, to transfer power therebetween,
the M DC/AC converters have primary sides directly connected to the AC buses and secondary sides directly connected to the common DC buses,
each DC/AC converter performs power conversion between the AC buses and the common DC buses, to transfer power therebetween,
the control unit includes a first converter control unit for each DC/DC converter and a second converter control unit for each DC/AC converter,
each first converter control unit controls the corresponding DC/DC converter by a first power command for the DC/DC converter based on the high-order control command,
each second converter control unit controls the corresponding DC/AC converter by a second power command for the DC/AC converter based on the high-order control command,
the first converter control unit calculates a first correction amount in accordance with a difference between primary-side voltage of the DC/DC converter and reference voltage and corrects the first power command, to adjust power transfer to/from the distributed power supply connection terminals on the secondary side, so that power in an input direction from the distributed power supply connection terminals to the DC/DC converter is decreased when the primary-side voltage is higher than the reference voltage, and is increased when the primary-side voltage is lower than the reference voltage, while the first converter control unit limits the corrected first power command by rated power of the DC/DC converter,
the power conversion device has a plurality of operation modes for transferring power between the connection terminals via the common DC buses by operations of the DC/DC converters and the DC/AC converters,
the plurality of operation modes include a first power transfer mode in which power is transferred between the distributed power supply connection terminals and the DC connection terminals, a second power transfer mode in which power is transferred between the distributed power supply connection terminals and the AC connection terminals, and a third power transfer mode in which power is transferred between the DC connection terminals and the AC connection terminals, and
the plurality of operation modes are determined so as to allow two or more of the operation modes to be combined at the same time.

2. The power conversion device according to claim 1, wherein
the first converter control unit sets the first correction amount to zero, when the first power command is smaller than a set lower limit value and the difference between the primary-side voltage of the DC/DC converter and the reference voltage is smaller than a lower limit value set for the difference.

3. The power conversion device according to claim 1, wherein
at least one of the DC distributed power supplies is a DC distributed power supply capable of charging and discharging.

4. The power conversion device according to claim 1, wherein
the number N of the DC/DC converters is plural and is not less than the number M of the DC/AC converters, and
the plurality of operation modes include a fourth power transfer mode in which power is transferred between a plurality of the distributed power supply connection terminals.

5. The power conversion device according to claim 3, wherein
the number N of the DC/DC converters is plural and is not less than the number M of the DC/AC converters, and
the plurality of operation modes include a fourth power transfer mode in which power is transferred between a plurality of the distributed power supply connection terminals.

6. The power conversion device according to claim 1, wherein
the second converter control unit calculates a second correction amount in accordance with a difference between secondary-side voltage of the DC/AC converter and second reference voltage and corrects the second power command, to adjust power transfer to/from the AC buses on the primary side, so that active power in an input direction from the AC buses to the DC/AC converter is decreased when the secondary-side voltage is higher than the second reference voltage, and is increased when the secondary-side voltage is lower than the second reference voltage, while the second converter control unit limits the corrected second power command by rated power of the DC/AC converter.

7. The power conversion device according to claim 3, wherein
the second converter control unit calculates a second correction amount in accordance with a difference between secondary-side voltage of the DC/AC converter and second reference voltage and corrects the second power command, to adjust power transfer to/from the AC buses on the primary side, so that active power in an input direction from the AC buses to the DC/AC converter is decreased when the secondary-side voltage is higher than the second reference voltage, and is increased when the secondary-side voltage is lower than the second reference voltage, while the second converter control unit limits the corrected second power command by rated power of the DC/AC converter.

8. The power conversion device according to claim 4, wherein
the second converter control unit calculates a second correction amount in accordance with a difference between secondary-side voltage of the DC/AC converter and second reference voltage and corrects the second power command, to adjust power transfer to/from the AC buses on the primary side, so that active power in an input direction from the AC buses to the DC/AC converter is decreased when the secondary-side voltage is higher than the second reference voltage, and is increased when the secondary-side voltage is lower than the second reference voltage, while the second converter control unit limits the corrected second power command by rated power of the DC/AC converter.

9. The power conversion device according to claim 1, wherein
the control unit receives the first power command for each DC/DC converter and the second power command for each DC/AC converter, as the high-order control command.

10. The power conversion device according to claim 1, wherein
the control unit generates the first power command for each DC/DC converter and the second power command for each DC/AC converter on the basis of the high-order control command.

11. The power conversion device according to claim 1, wherein
the first converter control unit multiplies a magnitude of the first power command by a gain not greater than 1 and then corrects a resultant magnitude of the first power command by the first correction amount, and the gain decreases when the difference between the primary-side voltage of the DC/DC converter and the reference voltage increases.

12. The power conversion device according to claim 3, wherein
the first converter control unit multiplies a magnitude of the first power command by a gain not greater than 1 and then corrects a resultant magnitude of the first power command by the first correction amount, and the gain decreases when the difference between the primary-side voltage of the DC/DC converter and the reference voltage increases.

13. The power conversion device according to claim 4, wherein
the first converter control unit multiplies a magnitude of the first power command by a gain not greater than 1 and then corrects a resultant magnitude of the first power command by the first correction amount, and the gain decreases when the difference between the primary-side voltage of the DC/DC converter and the reference voltage increases.

14. The power conversion device according to claim 6, wherein
the second converter control unit multiplies a magnitude of the second power command by a gain not greater than 1 and then corrects a resultant magnitude of the second power command by the second correction amount, and the gain decreases when the difference between the secondary-side voltage of the DC/AC converter and the second reference voltage increases.

15. The power conversion device according to claim 8, wherein
the second converter control unit multiplies a magnitude of the second power command by a gain not greater than 1 and then corrects a resultant magnitude of the second power command by the second correction amount, and the gain decreases when the difference between the secondary-side voltage of the DC/AC converter and the second reference voltage increases.

16. The power conversion device according to claim 1, wherein
the second converter control unit calculates a third correction amount in accordance with a difference between primary-side voltage of the DC/AC converter and AC reference voltage and corrects the second power command, to adjust power transfer to/from the AC buses on the primary side, so that active power in an input direction from the AC buses to the DC/AC converter is increased when the primary-side voltage is higher than the AC reference voltage, and is decreased when the primary-side voltage is lower than the AC reference voltage, while the second converter control unit limits the corrected second power command by rated power of the DC/AC converter.

17. The power conversion device according to claim 5, wherein
the second converter control unit calculates a third correction amount in accordance with a difference between primary-side voltage of the DC/AC converter and AC reference voltage and corrects the second power command, to adjust power transfer to/from the AC buses on the primary side, so that active power in an input direction from the AC buses to the DC/AC converter is increased when the primary-side voltage is higher than the AC reference voltage, and is decreased when the primary-side voltage is lower than the AC reference voltage, while the second converter control unit limits the corrected second power command by rated power of the DC/AC converter.

18. The power conversion device according to claim 1, wherein
the second converter control unit calculates a third correction amount in accordance with a difference between a primary-side frequency of the DC/AC converter and a reference frequency and corrects the second power command, to adjust power transfer to/from the AC buses on the primary side, so that active power in an input direction from the AC buses to the DC/AC converter is increased when the primary-side frequency is higher than the reference frequency, and is decreased when the primary-side frequency is lower than the reference frequency, while the second converter control unit limits the corrected second power command by rated power of the DC/AC converter.

19. The power conversion device according to claim 5, wherein
the second converter control unit calculates a third correction amount in accordance with a difference between a primary-side frequency of the DC/AC converter and a reference frequency and corrects the second power command, to adjust power transfer to/from the AC buses on the primary side, so that active power in an input direction from the AC buses to the DC/AC converter is increased when the primary-side frequency is higher than the reference frequency, and is decreased when the primary-side frequency is lower than the reference frequency, while the second converter control unit limits the corrected second power command by rated power of the DC/AC converter.

20. The power conversion device according to claim 1, wherein of the N pairs of distributed power supply connection terminals, a plurality of pairs of distributed power supply connection terminals are connected in parallel and then connected to the DC distributed power supply.

* * * * *